United States Patent
Su

(10) Patent No.: US 11,764,874 B2
(45) Date of Patent: *Sep. 19, 2023

(54) METHOD FOR PROCESSING LOW-RATE SERVICE DATA IN OPTICAL TRANSPORT NETWORK, APPARATUS, AND SYSTEM

(71) Applicant: Huawei Technologies Co., Ltd., Shenzhen (CN)

(72) Inventor: Wei Su, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/582,532

(22) Filed: Jan. 24, 2022

(65) Prior Publication Data

US 2022/0150179 A1  May 12, 2022

Related U.S. Application Data

(63) Continuation of application No. 17/094,259, filed on Nov. 10, 2020, now Pat. No. 11,233,571, which is a (Continued)

(51) Int. Cl.
*H04B 10/27* (2013.01)
*H04B 10/66* (2013.01)
(Continued)

(52) U.S. Cl.
CPC ......... *H04B 10/27* (2013.01); *H04B 10/0793* (2013.01); *H04B 10/66* (2013.01); (Continued)

(58) Field of Classification Search
CPC ........ H04B 10/27; H04B 10/40; H04B 10/66; H04L 7/0075
See application file for complete search history.

(56) References Cited

U.S. PATENT DOCUMENTS 11,233,571 B2 * 1/2022 Su .................. H04B 10/27
2007/0104485 A1 5/2007 Zhang
(Continued)

FOREIGN PATENT DOCUMENTS

CN 1741429 A 3/2006
CN 1770673 A 5/2006
(Continued)

OTHER PUBLICATIONS

Jean-Michel Caia et al, "FlexO-FR Structure Options and Considerations for 5G Mobile Fronthaul Transport", FiberHome Telecommunication Technologies, China Telecom, Geneva, Oct. 16-20, 2017, Intended type of document (R-C-TD):WD1112-38r1, total 14 pages.

*Primary Examiner* — Dzung D Tran
(74) *Attorney, Agent, or Firm* — Conley Rose, P.C.

(57) ABSTRACT

A method for processing low-rate service data, an apparatus, and a system, where the method includes: mapping low-rate service data into a newly defined low-rate data frame, where a rate of the low-rate data frame matches a rate of the low-rate service data, the data frame includes an overhead area and a payload area, the payload area is used to carry the low-rate service data, a rate of the payload area in the low-rate data frame is not less than the rate of the low-rate service data, and the rate of the low-rate service data is less than 1 Gbps; mapping the low-rate data frame into one or more slots in another data frame, where a rate of the slot is not greater than 100 Mbps; mapping the other data frame into an optical transport unit (OTU) frame; and sending the OTU frame.

23 Claims, 20 Drawing Sheets

C: Container
TUG: Tributary unit group
STM-N: Synchronous transmission module N
VC: Virtual container
AU: Administrative unit
TU: Tributary unit
AUG: Administrative unit group

Related U.S. Application Data continuation of application No. PCT/CN2018/086345, filed on May 10, 2018.

(51) Int. Cl.

| | | |
|---|---|---|
| *H04L 7/00* | (2006.01) | |
| *H04B 10/079* | (2013.01) | |
| *H04L 47/6275* | (2022.01) | |
| *H04L 47/80* | (2022.01) | |
| *H04L 47/70* | (2022.01) | |

(52) U.S. Cl.
CPC ........ *H04L 7/0075* (2013.01); *H04L 47/6275* (2013.01); *H04L 47/805* (2013.01); *H04L 47/829* (2013.01)

(56) References Cited

U.S. PATENT DOCUMENTS

| | | |
|---|---|---|
| 2007/0189336 A1 | 8/2007 | Zou |
| 2010/0142947 A1 | 6/2010 | Shin et al. |
| 2010/0226652 A1 | 9/2010 | Vissers et al. |
| 2012/0251127 A1 | 10/2012 | Ohkubo et al. |
| 2013/0064555 A1* | 3/2013 | Kitajima ............... H04L 7/0075 398/154 |
| 2015/0098703 A1 | 4/2015 | Wu et al. |
| 2016/0087739 A1* | 3/2016 | Kametani ............. H04J 3/0691 398/56 |
| 2016/0344471 A1 | 11/2016 | Meng et al. |
| 2017/0048022 A1* | 2/2017 | Kaino ................... H04L 1/0045 |
| 2017/0230736 A1 | 8/2017 | Su et al. |
| 2018/0041280 A1 | 2/2018 | Elahmadi et al. |
| 2019/0132049 A1 | 5/2019 | Cai et al. |

FOREIGN PATENT DOCUMENTS

| | | |
|---|---|---|
| CN | 1791057 A | 6/2006 |
| CN | 101217334 A | 7/2008 |
| CN | 101547057 A | 9/2009 |
| CN | 101695144 A | 4/2010 |
| CN | 105451102 A | 3/2016 |
| EP | 1737147 A1 | 12/2006 |
| EP | 1826926 A1 | 8/2007 |
| JP | 2011176750 A | 9/2011 |
| RU | 2439708 C2 | 1/2012 |
| WO | 2013185327 A1 | 12/2013 |
| WO | 2014180840 A1 | 11/2014 |

\* cited by examiner

FIG. 4C

ODU_LR(E1): 4 B FAS | 1 B MFAS | 3 B PM | 1 B APS/PCC | 140 B E1 | S

ODU_LR(E3): 4 B FAS | 1 B MFAS | 3 B PM | 1 B APS/PCC | 765 B E3 | S

ODU_LR(E4): 4 B FAS | 1 B MFAS | 3 B PM | 1 B APS/PCC | 2349 B E4 | S

B: Byte
MFAS: Multiframe alignment signal
E1, E3, and E4: PDH low-rate signals
APS/PCC: Automatic protection switching/protection communication channel
ODULR: Low-rate optical data unit
PM: Path monitoring
FAS: Frame alignment signal
S: Padding information (variable length)

ODU_LR(VC12): [HO|PLD|HO|PLD|HO|PLD|HO|PLD|HO|PLD|HO|PLD|HO|PLD|HO]
1B 15B 1B 15B 1B 15B 1B 15B 1B 16B 1B 16B 1B 16B 1B 16B

ODU_LR(VC3): [HO|PLD|HO|PLD|HO|PLD|HO|PLD|HO]
1B 85B 1B 85B 1B 85B 1B 85B 1B 85B

ODU_LR(VC4): [HO|PLD|HO|PLD|HO|PLD|HO|PLD|HO|PLD|HO|PLD|HO|PLD|HO]
1B 261B 1B 261B 1B 261B 1B 261B 1B 261B 1B 261B 1B 261B 1B

B: Byte
PLD: Load area (also referred as payload area)
ODU_LR: Low-rate optical data unit
OH: Overhead area

FIG. 6

Indication information (Pointer): uTSG.K start location indication information

METHOD FOR PROCESSING LOW-RATE SERVICE DATA IN OPTICAL TRANSPORT NETWORK, APPARATUS, AND SYSTEM

CROSS-REFERENCE TO RELATED APPLICATIONS

This application is a continuation of U.S. patent application Ser. No. 17/094,259, filed on Nov. 10, 2020, which is a continuation of International Patent Application No. PCT/CN2018/086345, filed on May 10, 2018. Both of the aforementioned applications are hereby incorporated by reference in their entireties.

TECHNICAL FIELD

This application relates to the field of optical communications technologies, and in particular, to a technology for processing service data in an optical transport network.

BACKGROUND

As a core technology of a backbone bearer network, an optical transport network (OTN) includes optical bearer containers with a plurality of rates, and the optical bearer containers are used to carry a plurality of types of high-rate service data. For example, an optical data unit (ODU) 0 (ODU0) is a bearer container with a lowest rate of approximately 1.25 gigabits per second (Gbps) in an existing OTN technology, and is used to carry 1 Gbit/s Ethernet service data.

As a synchronous digital hierarchy (SDH) technology is phased out from the market and the OTN technology develops, application of the OTN technology extends from a backbone network to a metropolitan area network, and even to an access network. As a result, a growing low-rate service carrying requirements are imposed on the OTN technology. Currently, a rate of a low-rate service ranges from 2 megabits per second (Mbps) to several hundred Mbps. A current processing method is as follows: A low-rate signal is multiplexed into a high-rate signal, and then the high-rate signal is carried through an existing optical bearer container. FIG. 1 is a schematic diagram of a mapping and multiplexing path of a low-rate service in other approaches. As shown in FIG. 1, currently, a plurality of low-rate signals are aggregated (that is, multiplexed) to form a high-rate signal. High-rate signals include a synchronous transport module (STM)-16, an STM-64, an STM-256, and the like, which can be mapped to existing OTN containers such as an ODU 1, an ODU 2, and an ODU 3 for transmission.

Specifically, using a signal with a rate of 2048 kilobits per second (kbit/s) as an example, the signal is also referred to as E1. As shown in FIG. 1, the E1 signal is first mapped to a container 12 (C12). Then, the C12 is mapped to a virtual container 12 (VC12). An overhead is added to the VC12, and then the VC12 is encapsulated into a tributary unit 12 (TU-12). The TU-12 is multiplexed to a tributary unit group 2 (TUG-2). The TUG-2 is multiplexed to a VC3. An overhead is added to the VC3, and then the VC3 is encapsulated into an administrative unit 3 (AU-3). The AU-3 is multiplexed to a management unit group (AUG). Then, a plurality of AUGs are combined to form an STM-N interface signal. The STM-N interface signal may be one of a plurality of high-rate STM signal types mentioned above. The foregoing STM-N interface signal may be transmitted through the existing OTN container.

A problem of the current processing method is that, a low-rate signal needs to be multiplexed for a plurality of times to form a high-rate signal, and then the high-rate signal is carried using the OTN technology. The processing process is complex and inefficient. In addition, because both a sending device and a receiving device need to perform frame processing hierarchically, a signal processing latency is relatively large.

SUMMARY

Embodiments of this application provide a method for processing service data in an optical transport network, and an apparatus, to resolve a problem that an existing processing process is complex and inefficient.

According to a first aspect, an embodiment of this application provides a method for processing service data in an optical transport network. The method is applied to a transmitter side, and the method includes: mapping low-rate service data into a first data frame, where the first data frame includes an overhead area and a payload area, the payload area is used to carry the low-rate service data, the overhead area is used to carry information used for management and maintenance of the low-rate service data, a rate of the payload area in the first data frame is not less than a rate of the low-rate service data, and the rate of the low-rate service data is less than 1 Gbps; mapping the first data frame into one or more slots in a second data frame, where a rate of the slot is not greater than 100 Mbps; mapping the second data frame into an optical transport unit (OTU) frame; and sending the OTU frame.

In a possible design, the overhead area includes a frame header indication, a multiframe indication, and path monitoring information. Optionally, the payload area includes padding information, and the padding information is used to eliminate a difference between the rate of the payload area in the first data frame and the rate of the low-rate service data.

In a possible design, a size of the first data frame is X*M bytes, where X and M are positive integers, and M represents a slot interleaving granularity of the second data frame. For example, the size may be 119 bytes, and M is equal to 1. Alternatively, the size of the first data frame is X*16 bytes, and M is equal to 16.

In a possible design, a quantity of bytes in the payload area in the first data frame is not greater than 1.25 times a quantity of bytes in a frame structure of the low-rate service data. In other words, the rate of the payload area in the first data frame is not greater than 1.25 times the rate of the low-rate data.

For example, the low-rate service data is one or more of the following: E1, E3, E4, a virtual container (VC) 12, a VC3, a VC4, a synchronous transport module (STM)-1, an STM-4, or Fast Ethernet (FE). The second data frame is an ODU 0, an ODU 1, an ODU 2, an ODU 3, an ODU 4, or an ODU flex.

In a possible design, the mapping the first data frame into one or more slots in a second data frame includes: mapping the first data frame into an intermediate frame, where a quantity of slots included in the intermediate frame is equal to a quantity of slots in the second data frame that are to be occupied by the first data frame; and mapping the intermediate frame into the one or more slots in the second data frame.

In a possible design, the second data frame has a multi-row and multi-column structure, and an integer quantity of rows in the second data frame are used to perform division into K slots. Alternatively, a plurality of second data frames are used to perform division into K slots, where K is a positive integer.

In a possible design, the method further includes: placing mapping information in the one or more slots in the second data frame, where the mapping information includes a quantity in a form of m bits and clock information that are of the first data frame and that are mapped into the one or more slots in the second data frame.

According to a second aspect, an embodiment of this application provides a method for processing service data in an optical transport network. The method is applied to a receiver side, and the method includes: receiving a first data frame, where the first data frame includes a plurality of slots, and a rate of the slot is not greater than 100 Mbps; demapping the first data frame to obtain a second data frame, where the second data frame includes an overhead area and a payload area, the payload area is used to carry low-rate service data, the overhead area is used to carry information used for management and maintenance of the low-rate service data, a rate of the payload area in the second data frame is not less than a rate of the low-rate service data, the rate of the low-rate service data is less than 1 Gbps, and one or more slots in the first data frame are used to carry the second data frame; and demapping the second data frame to obtain the low-rate service data.

In a possible design, the overhead area includes a frame header indication, a multiframe indication, and path monitoring information.

In a possible design, a size of the second data frame is X*M bytes, where X and M are positive integers, and M represents a slot interleaving granularity of the first data frame. For example, the size of the second data frame is 119 bytes, and M is equal to 1. Alternatively, the size of the second data frame is X*16 bytes, and M is equal to 16.

In a possible design, a quantity of bytes in the payload area in the second data frame is not greater than 1.25 times a quantity of bytes in a frame structure of the low-rate service data. In other words, the rate of the payload area in the second data frame is not greater than 1.25 times the rate of the low-rate data.

For example, in application, the low-rate service data is one or more of E1, E3, E4, a virtual container (VC) 12, a VC3, a VC4, a synchronous transport module (STM)-1, an STM-4, or FE.

In a possible design, the demapping the first data frame to obtain a second data frame includes: demapping the first data frame to obtain an intermediate frame, where a quantity of slots included in the intermediate frame is equal to a quantity of slots in the first data frame that are to be occupied by the second data frame; and demapping the intermediate frame to obtain the second data frame.

According to a third aspect, an embodiment of this application provides an apparatus, where the apparatus includes a processor and a memory. The memory stores program code, and the processor is configured to read and execute the program code stored in the memory, to implement the method according to any one of the first aspect or the designs of the first aspect.

According to a fourth aspect, an embodiment of this application provides an apparatus, where the processing apparatus includes a processor and a memory. The memory stores program code, and the processor is configured to read and execute the program code stored in the memory, to implement the method according to any one of the second aspect or the designs of the second aspect.

According to a fifth aspect, an embodiment of this application provides a chip. The chip is connected to a memory, and is configured to read and execute program code stored in the memory, to implement the method according to any one of the first aspect, the designs of the first aspect, the second aspect, or the designs of the second aspect.

According to a sixth aspect, an embodiment of this application provides a system, where the system includes the apparatus according to any one of the third aspect or the designs of the third aspect and the apparatus according to any one of the fourth aspect or the designs of the fourth aspect.

By defining a new ODU frame structure and a mapping procedure, a technology provided in the embodiments of this application can resolve a problem in other approaches that processing of low-rate service data is complex. This improves processing efficiency. In addition, a data processing technology provided in the embodiments of this application also has an advantage of a high processing rate without multi-level mapping.

BRIEF DESCRIPTION OF DRAWINGS

FIG. 4C is another possible schematic diagram of a frame structure of a low-rate data frame;

FIG. 6 is a schematic diagram of another possible slot division of an ODU data frame;

DESCRIPTION OF EMBODIMENTS

Figure 1:
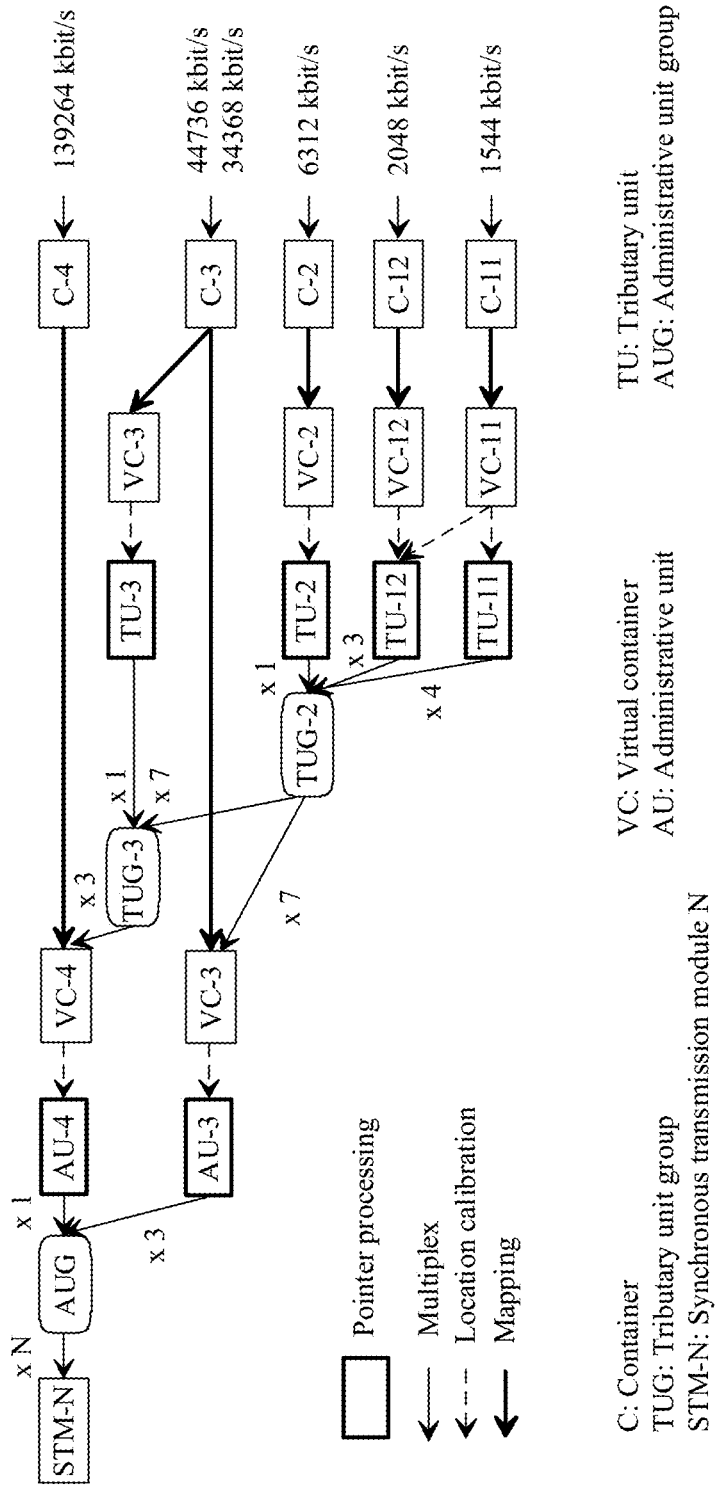
FIG. 1 is a schematic diagram of a mapping path of a low-rate service in other approaches.

Some terms in this application are first described, to help a person skilled in the art have a better understanding.

(1) "A plurality of" refers to two or more than two. The term "and/or" describes an association relationship between associated objects, and indicates that three relationships may exist. For example, A and/or B may indicate the following three cases: Only A exists, both A and B exist, and only B exists. In addition, in the descriptions of this application, terms such as "first" and "second" are merely used for distinction and description, and shall not be understood as an indication or implication of relative importance or an indication or implication of an order.

(2) Upstream or downstream: A source device A transmits data to a destination device B via a device M. In a data transmission direction, the device M is located between the device A and the device B. In other words, the device A is in an upstream direction of the device M, and the device B is in a downstream direction of the device M.

(3) A mathematical symbol "*" represents a multiplication sign.

Embodiments of this application are applicable to an optical network, for example, an OTN. One OTN is usually formed by connecting a plurality of devices through an optical fiber, and different topology types such as a linear topology, a ring topology, and a mesh topology may be formed depending on specific requirements. An OTN 200 shown in FIG. 2 includes eight OTN devices 201, namely, devices A to H. 202 denotes an optical fiber, and the optical fiber is used to connect two devices. 203 denotes a client service interface, and the client service interface is used to receive or send client service data. One OTN device may have different functions depending on actual requirements. Generally, OTN devices are classified into an optical-layer device, an electrical-layer device, and an optical/electrical hybrid device. The optical-layer device is a device that can process an optical-layer signal, for example, an optical amplifier (OA), or an optical add-drop multiplexer (OADM). The OA may also be referred to as an optical line amplifier (OLA), and is mainly configured to amplify an optical signal, to support a longer transmission distance while specific performance of the optical signal is ensured. The OADM is configured to perform spatial transformation on an optical signal, such that the optical signal may be output from different output ports (which are also referred to as directions sometimes). OADMs may be classified into a fixed OADM (FOADM), a reconfigurable OADM (ROADM), or the like based on different capabilities. The electrical-layer device is a device that can process an electrical-layer signal, for example, a device that can process an OTN signal. The optical/electrical hybrid device is a device that can process an optical-layer signal and an electrical-layer signal. It should be noted that, one OTN device may integrate a plurality of different functions depending on a specific integration requirement. The technical solutions provided in this application are applicable to OTN devices in different forms and having different integration.

It should be noted that, an OTN frame is a data frame used by the OTN device in the embodiments of this application, and is used to carry various service data and provide abundant management and monitoring functions. The OTN frame may be an ODU k, an ODU Cn, an ODU flex, an optical channel transport unit k OTUk, an OTU Cn, a flexible OTN (FlexO) frame, or the like. A difference between an ODU frame and an OTU frame lies in that the OTU frame includes an ODU frame and an OTU overhead. k represents a different rate level. For example, k=1 indicates 2.5 Gbps, and k=4 indicates 100 Gbps. Cn represents a variable rate, and is a rate that is a positive integer multiple of 100 Gbps. Unless otherwise specified, the ODU frame is any one of the ODU k, the ODU Cn, or the ODU flex, and the OTU frame is any one of the OTU k, OTU Cn, or the FlexO. It should be further noted that, in an implementation process, to simplify a frame design, one or more types of frames may be specified to carry a subsequently defined low-rate data frame. For example, it is specified that only the ODU flex is used. This is not limited in this application.

Figure 2:
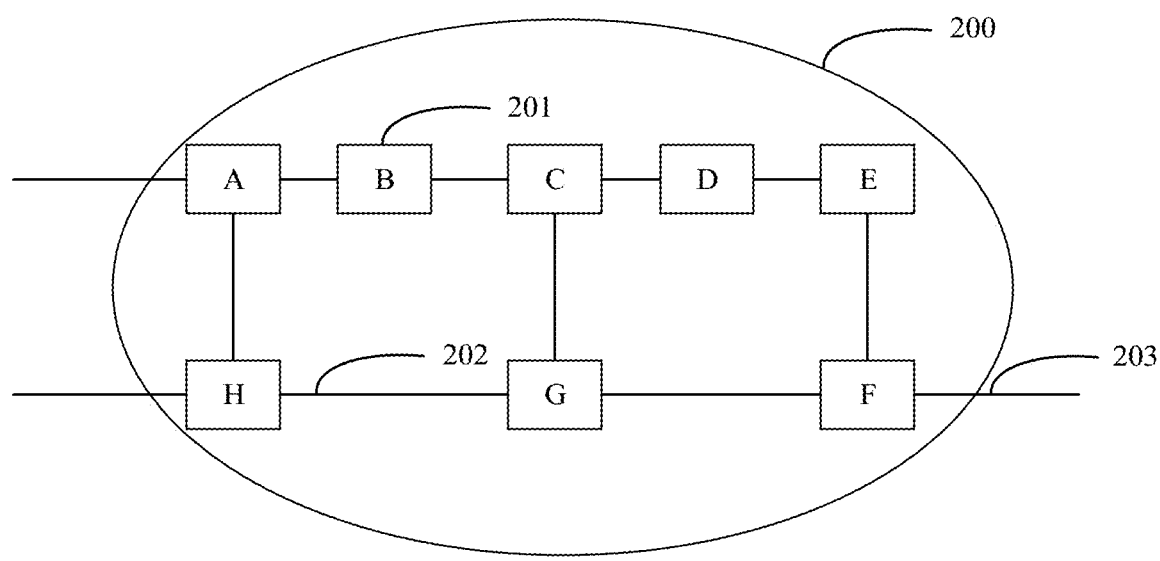
FIG. 2 is a schematic diagram of a possible application scenario according to an embodiment of this application.
Figure 3:
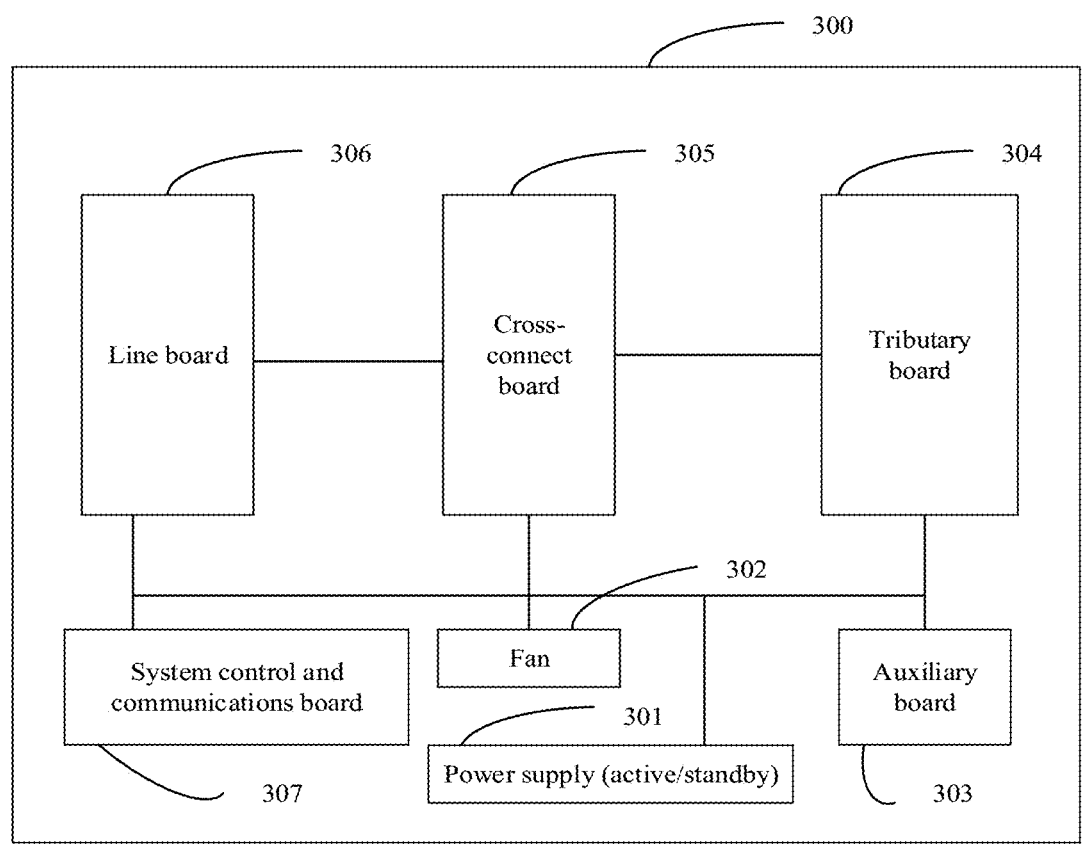
FIG. 3 is a schematic diagram of a possible hardware structure of a network device.

FIG. 3 is a schematic diagram of a possible hardware structure of a device, for example, a device A in FIG. 2. As shown, an OTN device 300 includes a power supply 301, a fan 302, and an auxiliary board 303, and may further include a tributary board 304, a line board 306, a cross-connect board 305, an optical-layer processing board (not shown in FIG. 3), and a system control and communications board 307.

It should be noted that types and quantities of boards that are included in each device may vary depending on a specific requirement. For example, a network device serving as a core node may not have the tributary board 304. A network device serving as an edge node may have a plurality of tributary boards 304. The power supply 301 is configured to supply power to the OTN device 300, and may include an active power supply and a standby power supply. The fan 302 is configured to dissipate heat generated by the device. The auxiliary board 303 is configured to provide an auxiliary function, for example, provide an external alarm or access an external clock. The tributary board 304, the cross-connect board 305, and the line board 306 are mainly configured to process an electrical-layer signal of the OTN device. The tributary board 304 is configured to receive and send various client services such as an SDH service, a packet service, an Ethernet service, and a fronthaul service. Further, the tributary board 304 may be divided into a client-side optical module and a signal processor. The client-side optical module may be an optical transceiver, and is configured to receive and/or send service data. The signal processor is configured to map service data into a data frame and demap the data frame to obtain the service data. The cross-connect board 305 is configured to implement exchange of data frames, and complete exchange of one or more types of data frames. The line board 306 mainly processes a data frame on a line side. For example, the line board 306 may consist of a line-side optical module and a signal processor. The line-side optical module may be a line-side optical transceiver, and is configured to receive and/or send a data frame. The signal processor is configured to multiplex and demultiplex a data frame on the line side, or map and demap a data frame. The system control and communications board 307 is configured to implement system control and communication. For example, information may be collected from different boards through a backplane, or a control instruction is sent to a corresponding board through a backplane. It should be noted that, unless otherwise specified, there may be one or more components (for example, a signal processor). This is not limited in this application. It should be further noted that, types of boards included in the device and specific function designs and quantities of the boards are not limited in this embodiment of this application.

To resolve a problem that current low-rate service processing is excessively complex, this application defines a new OTN frame structure. To simplify the description, the frame structure is referred to as an $ODU_{LR}$, where LR represents a low rate. It should be noted that the name is merely an example, and does not constitute a limitation on a frame structure defined in this application. The following first briefly describes a location of the $ODU_{LR}$ in a current OTN frame hierarchy, and then provides several examples of $ODU_{LR}$ frame structures.

Figure 4A:
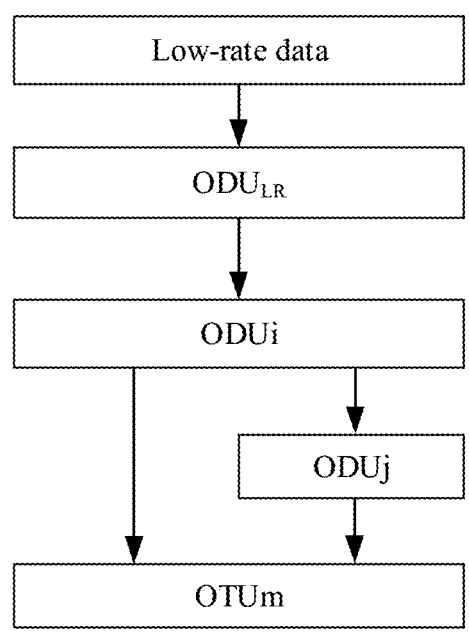
FIG. 4A is a schematic diagram of a possible low-rate data frame mapping hierarchy.

FIG. 4A shows an example of a mapping hierarchy of an OTN frame to which an $ODU_{LR}$ is added. In this application, data of a low-rate service is mapped to the ODULR. Then, the $ODU_{LR}$ is sequentially placed in an $ODU_i$ and an $OTU_m$, or placed in an $ODU_i$, an ODUj, and an $OTU_m$. Values of i, j, and m are application-dependent, and various OTN frames mentioned above may be selected. This is not specifically limited in this application. For example, a mapping path may be $ODU_{LR}$=>ODU flex=>$OTU_3$, or may be $ODU_{LR}$=>$ODU_2$=>$ODU_3$=>$OTU_4$. The data of the service may also be referred to as a service signal, client data, or client service data.

Figure 4B:
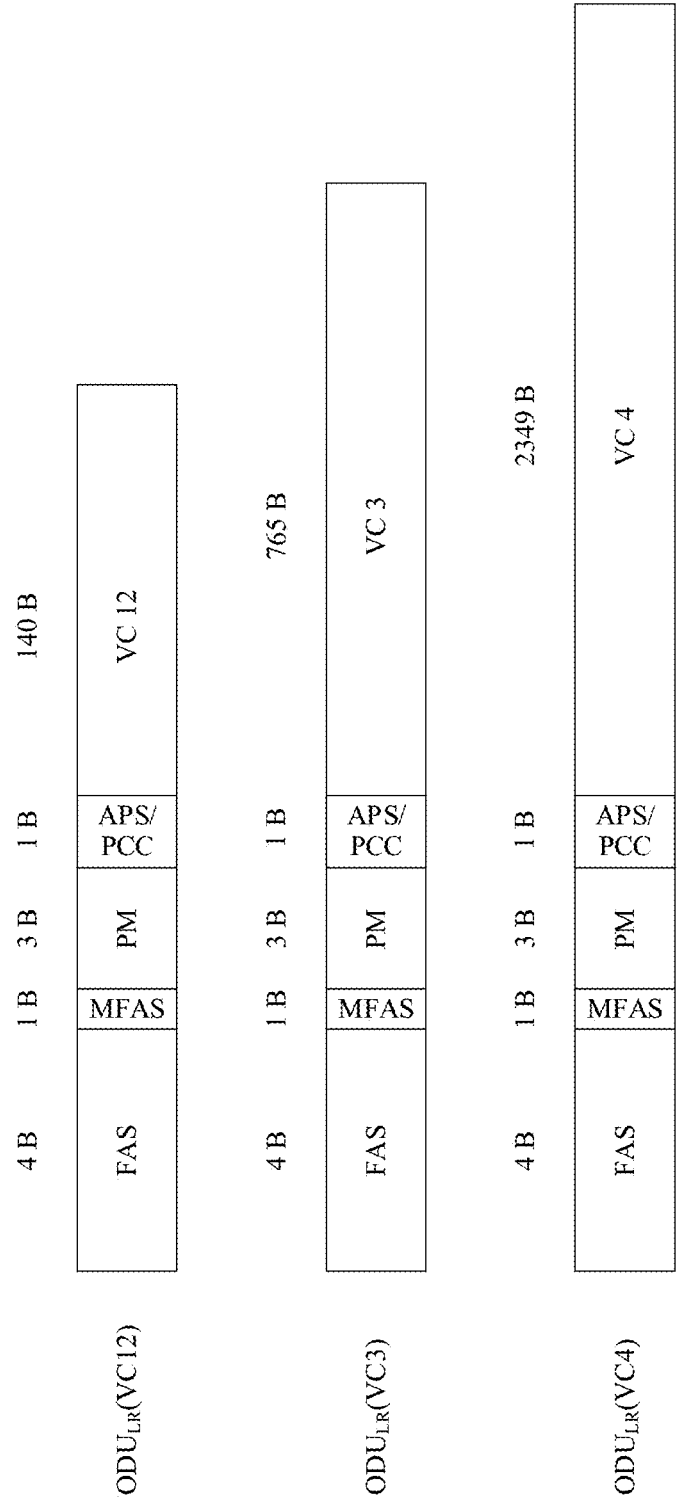
FIG. 4B is a possible schematic diagram of a frame structure of a low-rate data frame.
Figure 4D:
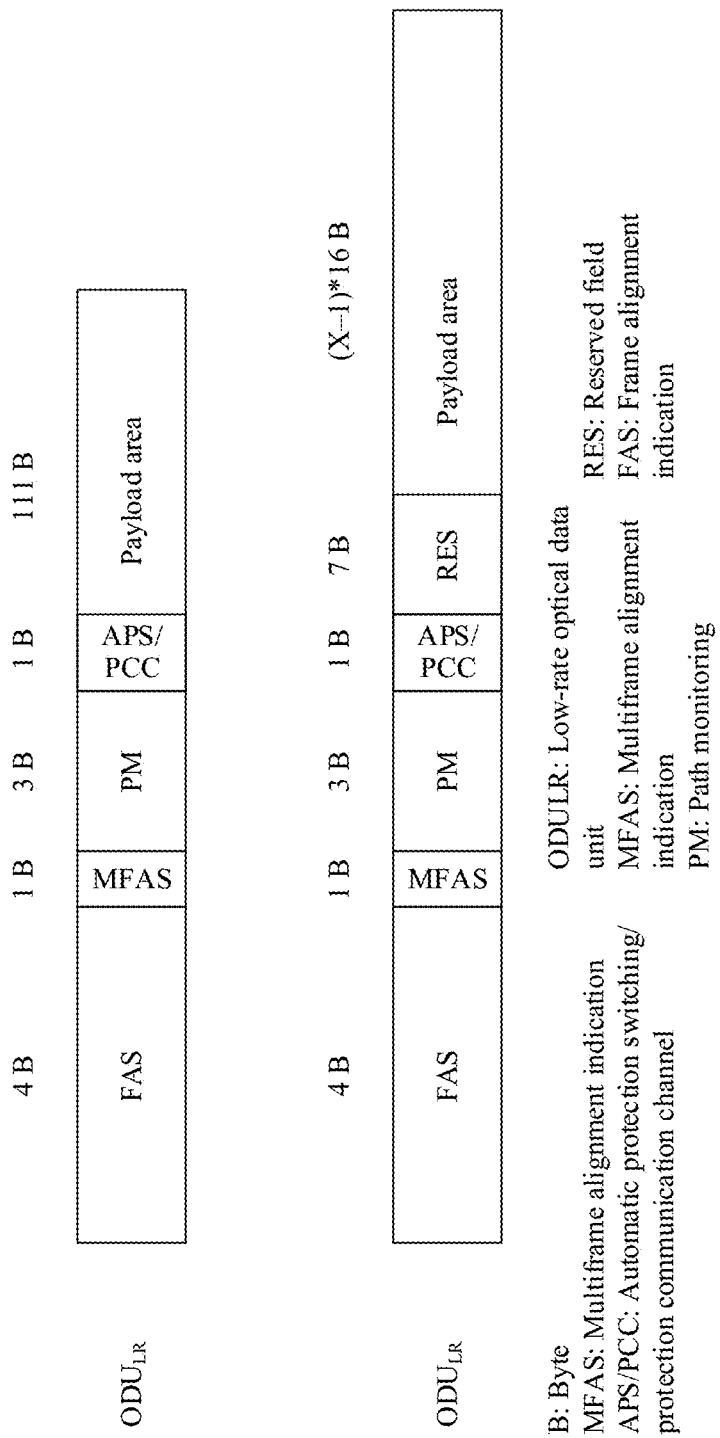
FIG. 4D is still another possible schematic diagram of a frame structure of a low-rate data frame.

FIG. 4B to FIG. 4D are schematic diagrams of a plurality of types of $ODU_{LR}$ frame structures. An $ODU_{LR}$ frame structure shown in FIG. 4B is specific to low-rate SDH service signals such as a VC12, a VC3, and a VC4. An $ODU_{LR}$ frame structure shown in FIG. 4C is the same as the structure shown in FIG. 4B, but client signals carried on the $ODU_{LR}$ frame structure are low-rate plesiochronous digital hierarchy (PDH) service signals such as E1, E3, and E4. FIG. 4D shows two general $ODU_{LR}$ frame structures, which may be used to carry different types of service signals. It should be noted that, the examples shown in FIG. 4B and FIG. 4C are examples of corresponding frame structures customized for different signals, such that a data format of a service highly matches a frame structure that carries the service, and service data is carried through less padding or no padding. In this way, transmission efficiency is improved, and same bit error check performance and frequency jitter and drift performance of an original service in an SDH network are maintained. However, a general $ODU_{LR}$ frame structure provided in FIG. 4D is applicable to different service types, and processing is simple. In actual application, any one or more frame structure designs may be selected depending on a design requirement.

The following further describes examples of the frame structures in FIG. 4B to FIG. 4D. It should be noted that an $ODU_{LR}$ frame structure includes an overhead area and a payload area. The payload area is used to carry low-rate service data, and the overhead area is used to carry overhead information used for management and maintenance in a data transmission process.

As shown in FIG. 4B, frame lengths (namely, quantity of bytes included in frames) of an $ODU_{LR}$(VC12), an $ODU_{LR}$(VC3), and an $ODU_{LR}$(VC4) are 149 bytes, 774 bytes, and 2358 bytes (byte, referred to as B below) respectively, and the $ODU_{LR}$(VC12), the $ODU_{LR}$(VC3), and the $ODU_{LR}$(VC4) are used to carry three types of SDH service data, that is, a VC12, a VC3, and a VC4 respectively. For the three frame structures, an example size of overhead areas is 9 B, and example sizes of payload areas are 140 B, 765 B, and 2349 B respectively. It should be noted that, byte lengths of the VC12, the VC3, and the VC4 defined in a current SDH standard are the same as the payload areas in the corresponding $ODU_{LR}$ frame structures, that is, 140 B, 765 B, and 2349 B respectively. In other words, the payload areas in the dedicated $ODU_{LR}$ frame structures are all used to carry client service data. In this way, utilization of the OTN frame structure is improved, and same bit error check performance and frequency jitter and drift performance of an original service in the SDH network are maintained. Using the VC12 as an example, one VC12 frame may be carried by one $ODU_{LR}$(VC12). In addition, frame periods of the $ODU_{LR}$(VC12), the $ODU_{LR}$(VC3), and the $ODU_{LR}$(VC4) may be set to 500 microseconds (μs), 125 μs, and 125 μs. The advantage is that a frame period of the $ODU_{LR}$ is the same as a frame period of a VC signal carried on the $ODU_{LR}$. In this way, a clock feature (sometimes referred to as a frequency feature) of a service can be maintained, thereby avoiding an excessive jitter during framing of a receiving device, and improving framing accuracy. It should be noted that a frame period is time used for sending a data frame. Table 1 provides some basic parameters of the three $ODU_{LR}$ frame structures shown in FIG. 4B. It should be noted that a bit rate of the $ODU_{LR}$ frame may be calculated based on a rate of an SDH signal carried on the $ODU_{LR}$ frame. For example, the rate of the $ODU_{LR}$ is equal to the rate of the SDH signal carried on the $ODU_{LR}$*(a quantity of bytes in the $ODU_{LR}$/a quantity of bytes in an SDH signal frame). Rates of the VC12, the VC3, and the VC4 are 2.24 Mbit/s, 48.96 Mbit/s, and 150.336 Mbit/s respectively.

TABLE 1

Some basic parameters of the three $ODU_{LR}$ frame structures shown in FIG. 4B and FIG. 4C

| Frame structure | Rate (Unit: Mbps) | Frame size (Unit: B) | Frame period (Unit: μs) |
|---|---|---|---|
| $ODU_{LR}$(VC12), and $ODU_{LR}$(E1) | 2.384 | 149 | 500 |
| $ODU_{LR}$(VC3), and $ODU_{LR}$(E3) | 49.536 | 774 | 125 |
| $ODU_{LR}$(VC4), and $ODU_{LR}$(E4) | 150.912 | 2358 | 125 |

Figure 5:
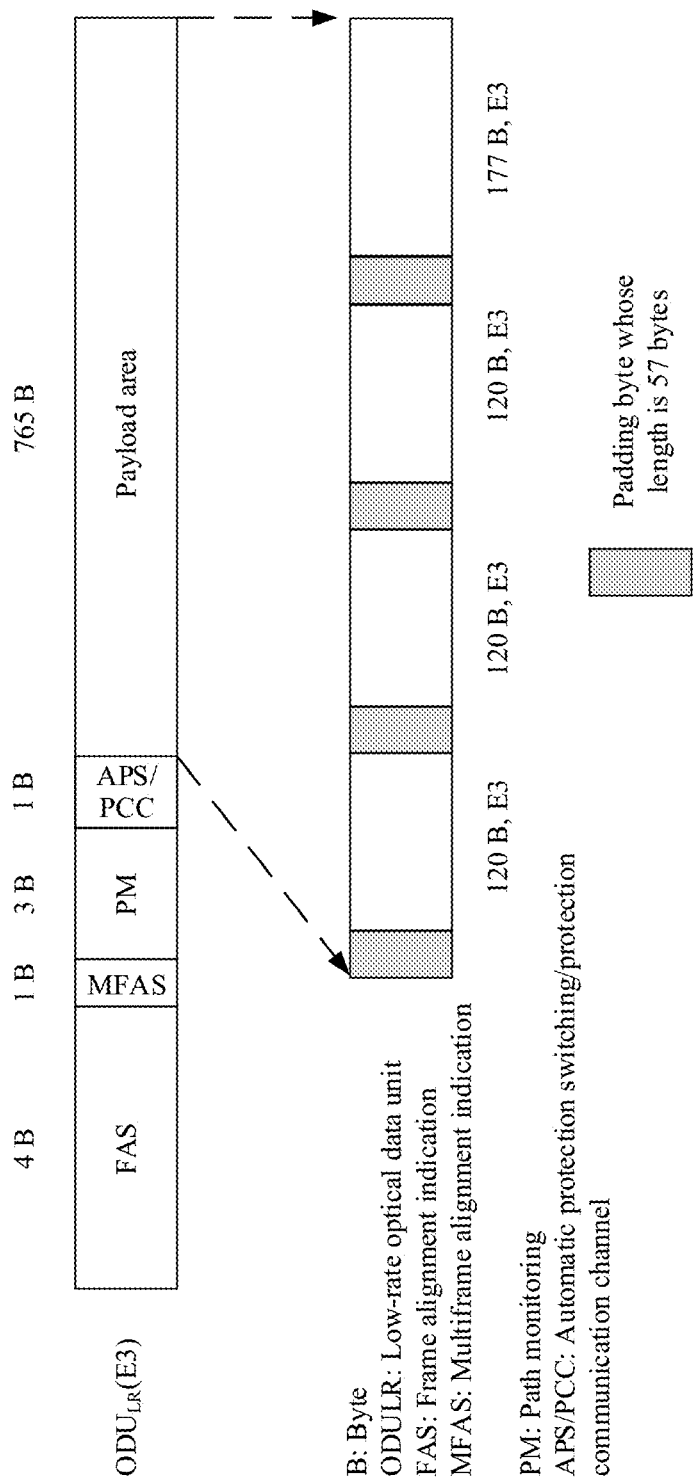
FIG. 5 is a schematic diagram of possible slot division of an ODU data frame.

As shown in FIG. 4C, lengths of the frame structures: the $ODU_{LR}$(E1), the $ODU_{LR}$(E3), and the $ODU_{LR}$(E4) are the same as those of the three frame structures shown in FIG. 4B. A difference is that the frame structure shown in FIG. 4C carries three PDH signals: E1, E3, and E4 whose rates are 2.048 Mbps, 34.368 Mbps, and 139.264 Mbps respectively, where the rates are slightly lower than the rates of the three SDH signals mentioned above. Therefore, the frame structure defined in FIG. 4B may be reused. To eliminate a rate difference between a PDH signal and an $ODU_{LR}$ frame corresponding to the PDH signal, rate adaptation is required during mapping. In a possible manner, a PDH signal may be encapsulated into a corresponding SDH data frame, to be more specific, E1 to the VC12, E3 to the VC3, and E4 to the VC4, and then mapped into a corresponding $ODU_{LR}$ frame. In another possible manner, a PDH signal may be directly mapped into a payload area in a corresponding $ODU_{LR}$ frame, and some padding information is padded to eliminate a rate difference between the PDH signal and the $ODU_{LR}$ frame that carries the signal. For example, for the E3 service signal, as shown in FIG. 5, a 765 B payload area may be divided into four 57 B areas, three 120 B areas, and one 177 B area. The four 57 B areas include padding bytes used to carry the padding information, and the other parts are used to carry the E3 signal. This padding manner can ensure a relatively even data sending speed and reduce a delay. Another PDH signal may also be carried and transmitted in a similar padding manner. It should be noted that, FIG. 5 shows merely an example, and a location of the padding information in the payload area in the $ODU_{LR}$ frame may alternatively be determined in another division manner. For example, a 228 B area is divided as a padding area. A location of the padding information is not limited in this application. Generally, the padding information occupies less than or equal to 20% of a total quantity of bytes in the payload area in the $ODU_{LR}$ frame. In other words, the quantity of bytes in the payload area in the $ODU_{LR}$ frame is not greater than 1.25 times a quantity of bytes of the client data. It should be further noted that the padding information does not carry any actual data or overhead, and is only used to match a rate difference between the client signal and a data frame that carries the client signal. Usually, the padding byte is a predefined special character.

FIG. 4D is a schematic diagram of two possible normalized $ODU_{LR}$ frame structures. Lengths of the two possible normalized $ODU_{LR}$ frame structures are 119 bytes and X*16 bytes respectively, where X is a positive integer. During designing of a normalized $ODU_{LR}$ frame structure, a length of the frame structure may be designed to be an integer multiple of a slot interleaving granularity of a data frame that carries the frame structure. The slot interleaving granularity refers to a basic length occupied by one slot during slot division of a data frame. Usually, one slot needs to occupy a plurality of basic lengths. Reference may be made to explanations and descriptions using examples in FIG. 7 and FIG. 8A to FIG. 8C. In FIG. 4D, 119 bytes are understood as 119*1 bytes, where a slot interleaving granularity is 1 byte, and X*16 bytes indicate that a slot interleaving granularity is 16 bytes. It should be noted that, the slot interleaving granularity may be determined depending on a specific requirement, for example, may be defined as 1 byte, 4 bytes ($2^2$ bytes), 8 bytes ($2^3$ bytes), 16 bytes ($2^4$ bytes), 20 bytes, or the like. This is not limited in this application. It should be further noted that the normalized design may be used for carrying a plurality of low-rate signals, for example, used for a low-rate private line service defined currently or in the future. It should be noted that, in the foregoing various $ODU_{LR}$ examples, the client signal may be mapped into the $ODU_{LR}$ frame in a synchronous mapping mode. It should be further noted that, in the foregoing example of the $ODU_{LR}$ frame structure, the overhead area in the $ODU_{LR}$ may include a frame alignment signal (FAS), a multi-frame alignment signal (MFAS), path monitoring (PM), and automatic protection switching/protection communication channel (APS/PCC) bytes, which occupy 4 bytes, 1 byte, 3 bytes, and 1 byte respectively. Optionally, the overhead area may further include a reserved field (RES) shown in FIG. 4D. The $ODU_{LR}$ includes only a small amount of overhead information used to implement end-to-end management and monitoring. This helps improve service carrying efficiency of a frame and reduce processing complexity. It should be noted that, in the foregoing overhead, the FAS is necessary information, and is used to implement a framing function of the $ODU_{LR}$ frame. Other information included in the overhead area is optional. For example, when a quantity of bytes required for one piece of information in the overhead area exceeds an allocated quantity of bytes in the overhead area for the information, the MFAS may need to be included. For another example, if a protection switching function or a path monitoring function is required, correspondingly, the overhead area needs to include the APS/PCC or the PM information. It should be further noted that overhead locations shown in FIG. 4B to FIG. 4D are merely examples. In an implementation process, the $ODU_{LR}$ frame may alternatively be designed as a structure with overheads and loads staggered. FIG. 6 shows an example. In the $ODU_{LR}$(VC12) frame in this example, overheads with a total length of nine bytes are separately placed in nine locations, and loads occupy other positions. In other words, for the $ODU_{LR}$ (VC12), one overhead byte is inserted every 15 payload bytes in the first four 15 payload bytes, and one overhead byte is inserted every 16 payload bytes in the last five 16 payload bytes. There are 149 bytes in total. Similarly, in the $ODU_{LR}$(VC3) and the $ODU_{LR}$(VC4), overheads and loads are also distributed in the $ODU_{LR}$ data frame in a staggered manner. In the $ODU_{LR}$(VC3), one overhead byte is inserted every 85 payload bytes, and there are 774 bytes in total. In the $ODU_{LR}$(VC4), one overhead byte is inserted every 261 payload bytes, and there are 2358 bytes in total.

It should be further noted that $ODU_{LR}$ frame structures shown in FIG. 4B to FIG. 4D, FIG. 5, and FIG. 6 are one-row and multi-column structures. In actual use, the frame may be presented in a multi-row and multi-column structure, or a multi-row and one-column structure.

The current OTN frame structure supports only 1.25 Gbps slot division in which a slot granularity is quite large, and is unfavorable for carrying low-rate service data. To efficiently carry the foregoing defined $ODU_{LR}$ frame, the existing OTN frame structure needs to be further divided into slots. In this application, the existing OTN frame is divided into K slots. A rate of one slot is much lower than that of a conventional slot. For differentiation, a slot newly defined in this application is referred to as a micro slot. A rate of the micro slot may be a low rate such as 2.5 Mbps, 5 Mbps, or 20 Mbps. A maximum rate of the micro slot is 100 Mbps. The $ODU_{LR}$ frame may occupy one or more micro slots in a data frame that carries the $ODU_{LR}$ frame. A quantity of occupied slots depends on a rate of the $ODU_{LR}$ and a rate of a micro slot. For details, refer to descriptions in subsequent embodiments.

In this application, slot division of the ODU frame that carries the $ODU_{LR}$ may be performed in rows or frames. For example, the slot division in rows means that a second data frame with r rows is considered as a whole for slot division; and the slot division in frames means that s ODU frames are considered as a whole for slot division. For simple description, subsequently, a frame used as a whole for slot division is referred to as a micro slot group (uTSG.K), where K represents a quantity of micro slots into which the frame structure can be divided. For a uTSG.K, K represents a fixed value, for example, 512 or 480. Additionally, K may be determined based on a frame feature of the second data frame, a rate of a target micro slot, and a size of the uTSG.K. Currently, the payload area in the ODU frame structure includes 4*3808 bytes, that is, 4 rows*3808 columns, where one row includes 3808 bytes, and one frame includes 15232 bytes. If the uTSG.K occupies r rows in one ODU frame, the size of uTSG.K is r*3808 bytes. If the uTSG.K frame occupies s ODU frames, the size of the uTSG.K frame is s*4*3808 bytes. To maintain consistency with the second data frame, the size of the uTSG.K is usually designed to be an integer multiple of a slot interleaving granularity of the second data frame, namely, N*M bytes, where M represents the slot interleaving granularity (which is referred to as a code block for short below) of the second data frame, and N is a positive integer.

The following uses an example in which the uTSG.K is N*M bytes for description. After values of K and M are determined, a value of N may be calculated based on the two values. If slot division of the second data frame is performed in rows, to reduce or avoid additional padding information, N may be a least common multiple of 3808/M and K. In other words, N=LCM (3808/M, K). Because r*3808=N*M, r=N*M/3808. Similarly, if r second data frames are used to constitute the uTSG.K, to reduce or avoid padding information, N may be a least common multiple of 15232/M and K. In other words, N=LCM (15232/M, K). Because r*4*3808=r*15232=N*M, r=N*M/15232. It should be noted that, it is assumed that M is an exponential power of 2. For example, m is 1, 2, 4, 8, or 16. In this case, a code block is placed in a row in a data frame. If M is another value, for example, 10, one code block may need to be placed across rows. This is not limited in this application.

Figure 7:
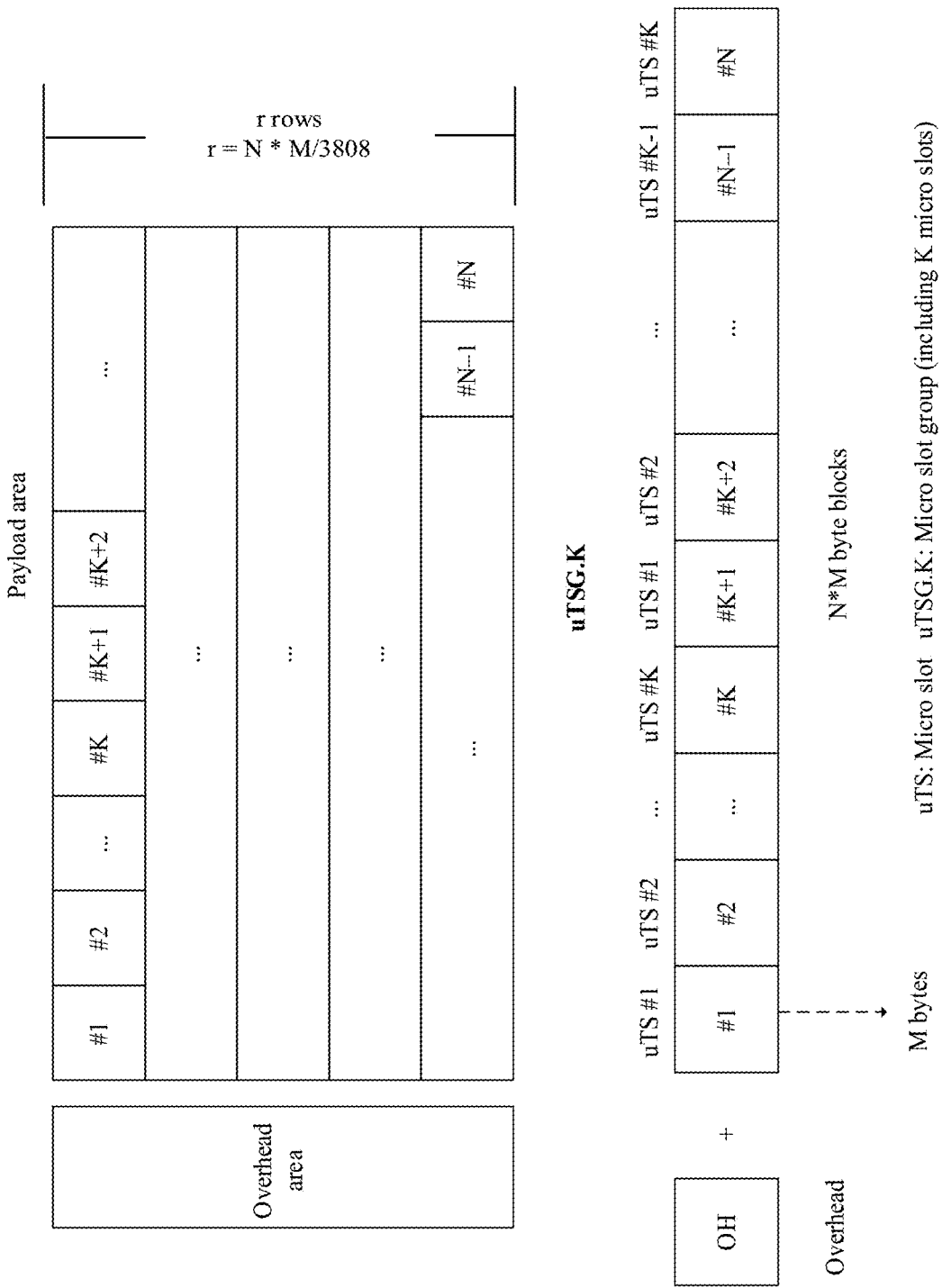
FIG. 7 is a schematic diagram of a uTSG.K frame structure and possible slot division of a second data frame.

FIG. 7 shows an example of slot division of an OTN frame, where the OTN frame with r rows constitutes a uTSG.K. As shown in the upper part of FIG. 7, the OTN frame with r rows is divided into N*M code blocks, to support K micro slots. A code block 1 to a code block K (namely, code blocks #1 to #K in FIG. 7) are specific to a micro slot 1 to a micro slot K, that is, are used to place the first code blocks in the corresponding micro slots. A code block (K+1) to a code block 2K are specific to a micro slot 1 to a micro slot K, that is, are used to place the second code blocks in the corresponding micro slots. The rest can be deduced by analogy. The lower part of FIG. 7 shows a relationship between the uTSG.K and micro slots in a one-row and multi-column structure. It can be learned from the figure that, using a micro slot 1 as an example, the micro slot occupies a code block 1, a code block (K+1), a code block (2K+1), . . . , and a code block (N−K+1) in the uTSG.k. Each micro slot has a total of N/K code blocks. It should be noted that one micro slot includes two parts, where one part is in an overhead area (not shown in FIG. 7), and the other part is in a payload area. Each of the micro slots #1 to #K defined in the figure may be used to carry an $ODU_{LR}$ frame. It should be noted that a rate of an OTN frame that needs to be divided into micro slots is not limited in this application. In actual application, an appropriate frame structure in an existing OTN frame structure hierarchy may be selected depending on a specific requirement to perform micro slot division for $ODU_{LR}$ carrying.

Figure 8A:
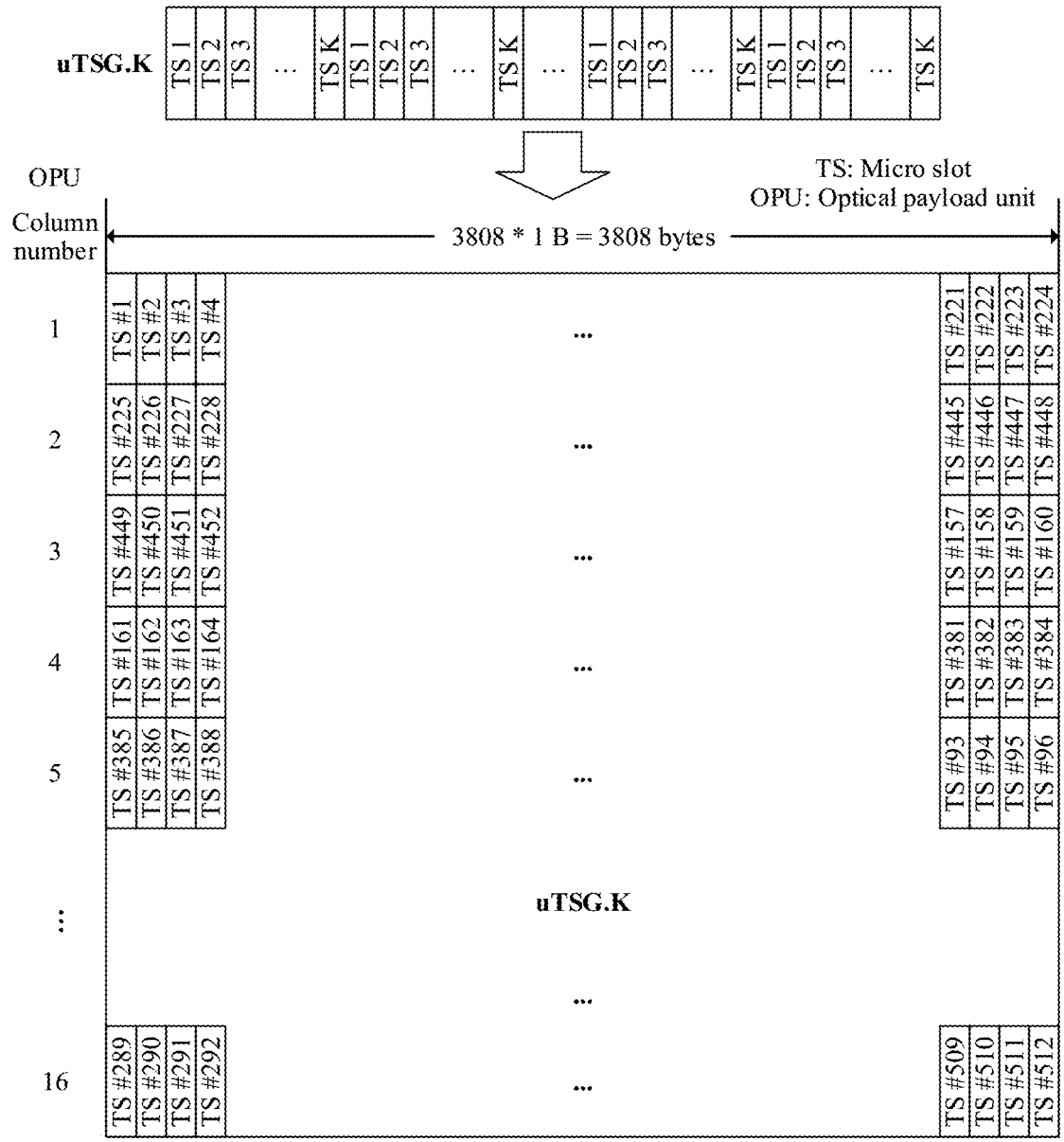
FIG. 8A shows an example of a uTSG.K frame structure and slot division of a second data frame.
Figure 8B:
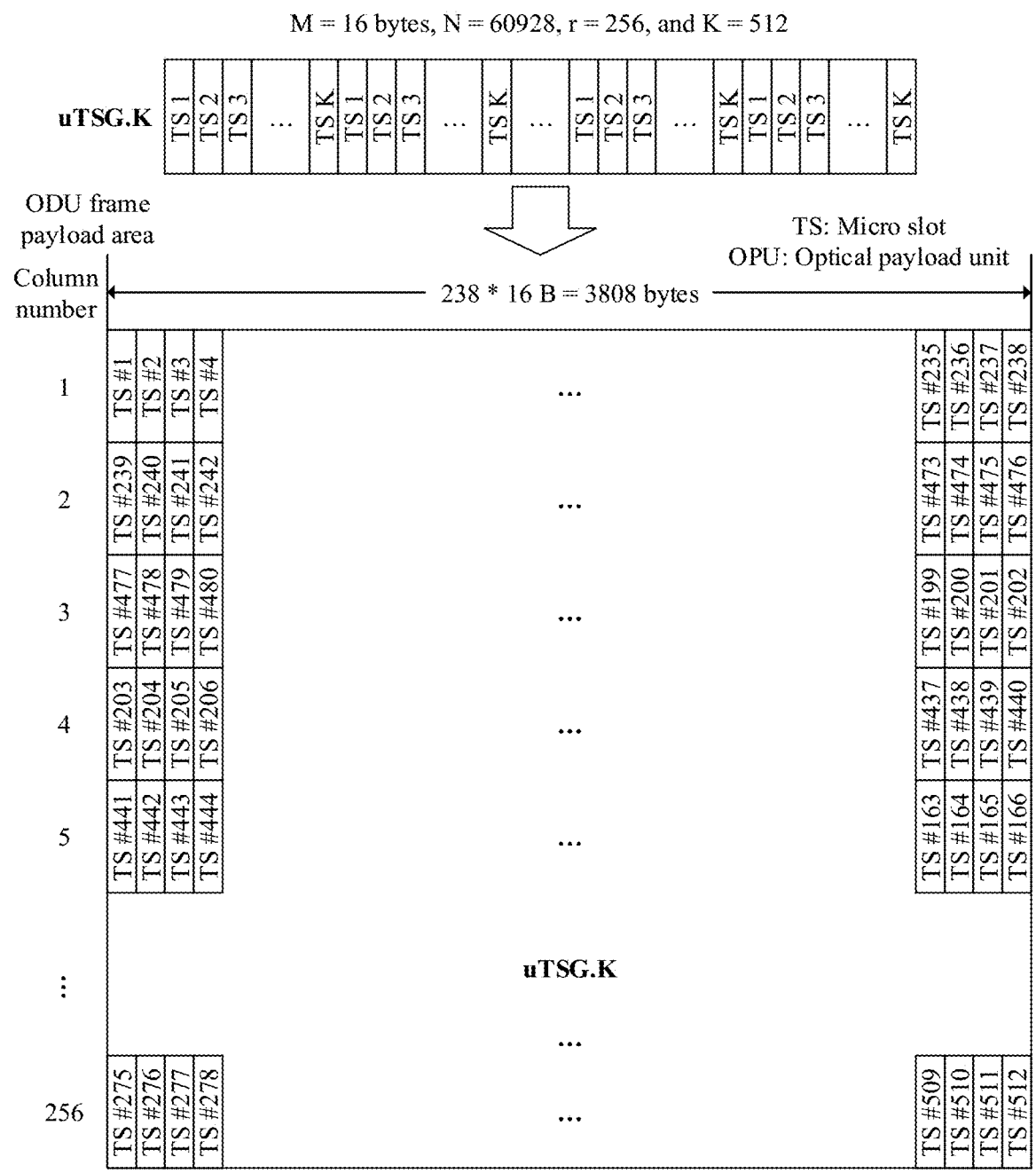
FIG. 8B shows another example of a uTSG.K frame structure and slot division of a second data frame.
Figure 8C:
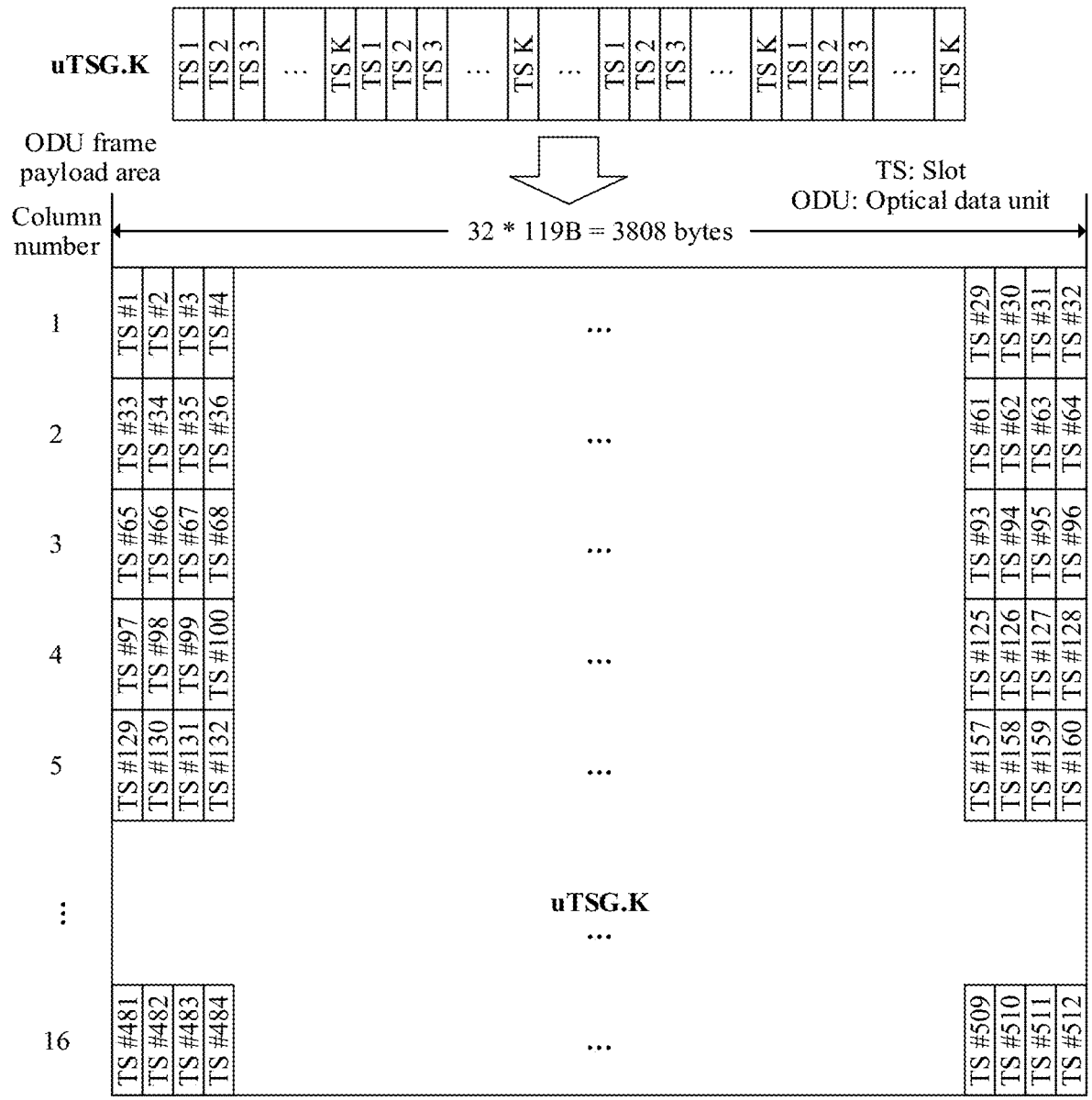
FIG. 8C shows still another example of a uTSG.K frame structure and slot division of a second data frame.

The following provides examples of slot division of the second data frame with reference to FIG. 8A to FIG. 8C. These examples are all described using division in r rows as an example. A person skilled in the art may learn that division in s frames is similar, and details are not described herein again. In FIG. 8A, K=512 and M=1 are used as an example. N=LCM (3808/1, 512)=60928 may be obtained through calculation according to the foregoing formula. In other words, the uTSG.K includes 60928*1 bytes. In FIG. 8B, K=512 and M=16 are used as an example. According to the foregoing formula, N=LCM (3808/1, 512)=60928. In other words, the uTSG.K includes 60928*16 bytes. In FIG. 8C, K=512 and M=119 are used as an example. According to the formula, N=LCM (3808/1, 512)=512. In other words, the uTSG.K includes 60928*119 bytes. r is 16, 256, and 16 respectively in the three examples. It should be noted that FIG. 8A to FIG. 8C show only slot division of the payload area (also referred to as an optical payload unit (OPU) frame) in the ODU frame. In actual application, a calculation formula may not be provided, and values of a rate of a micro slot, a quantity of micro slots, and a slot interleaving granularity of the micro slot, a size of a basic unit for slot division, and the like may be directly provided. The foregoing example is a case in which there is no padding information, such that carrying efficiency is relatively high. In actual application, slot division may alternatively be performed using a method in which a relatively small amount of padding information is used. This is not limited in this application.

Figure 9:
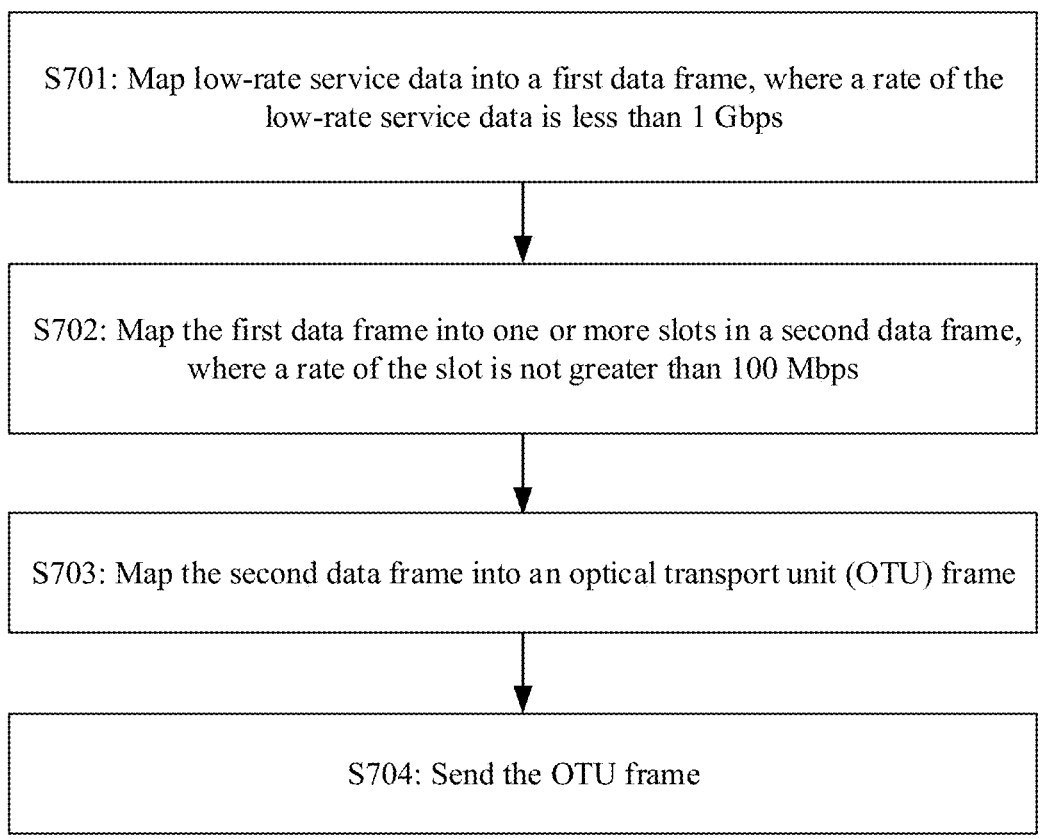
FIG. 9 is a possible flowchart of processing low-rate service data.

With reference to FIG. 9, the following further describes a method for processing low-rate service data provided in this application. As shown in FIG. 9, an OTN device that serves as a transmit end needs to perform the following steps, to carry low-rate service data.

S701: Map low-rate service data into a first data frame, where a rate of the low-rate service data is less than 1 Gbps.

For example, the OTN device maps the received low-rate service data to any one of the foregoing defined $ODU_{LR}$ frames. In other words, the first data frame is an $ODU_{LR}$ frame. The first data frame includes an overhead area and a payload area. The payload area is used to carry the low-rate service data. The overhead area is used to carry information used for management and maintenance (sometimes also referred to as information used for running, management, and maintenance) of the low-rate service data. A rate of the payload area in the first data frame is not less than the rate of the low-rate service data. This application pertains to a service that cannot be directly carried in an OTN container in other approaches due to a relatively low rate. Generally, a rate of this type of service is less than 1 Gbps, or less than 500 Mbps, or even lower (for example, only several megabytes to dozens of megabytes). To improve transmission efficiency, a rate of the first data frame may match the low-rate service data. Rate matching means that the rate of the payload area in the first data frame is equal to the rate of the service data, or the rate of the payload area in the first data frame falls within a range of (the rate of the service data, the rate of the service data*1.25), or the rate of the first data frame falls within a range of (the rate of the service data, the rate of the service data*1.25).

S702: Map the first data frame into one or more slots in a second data frame, where a rate of the slot is not greater than 100 Mbps.

For example, the OTN device needs to further process the $ODU_{LR}$ frame, that is, map the $ODU_{LR}$ frame into an ODU frame with a higher rate. The $ODU_{LR}$ frame occupies one or more slots of the ODU frame with a higher rate. The slot is the micro slot mentioned above. The rate of the slot is not greater than 100 Mbps.

S703: Map the second data frame into an optical transport unit (OTU) frame.

For example, the OTN device needs to encapsulate the foregoing ODU data frame with a higher rate into the OTU frame. In one manner, the ODU data frame is directly encapsulated into the OTU frame without being multiplexed. For example, an ODU 2 frame is encapsulated into an OTU 2 frame. In another implementation, the ODU data frame is further multiplexed into the ODU data frame with a higher rate, and then encapsulated into the OTU frame. For example, an ODU flex frame is multiplexed into an ODU 3 frame, and then the ODU 3 frame is encapsulated into an OTU 3 frame.

S704: Send the OTU frame.

For example, the OTN device sends the generated OTU frame to a downstream network device.

The following further describes the embodiments of this application in detail based on some common aspects of this application described above.

An embodiment of this application provides a method for processing low-rate data, an apparatus, and a system. In this embodiment, the network scenario in FIG. 2 is used as an example. It is assumed that a transmit end device in this embodiment is A, and a receive end device is H. It should be noted that A and H are merely examples, and a path between A and H may be replaced with another path for transmitting low-rate service data. For example, the path may be replaced with a path: device A-device H-device G-device F, where the device A is a source device, the device F is a destination device, and the device H and the device G are intermediate devices.

Figure 10:
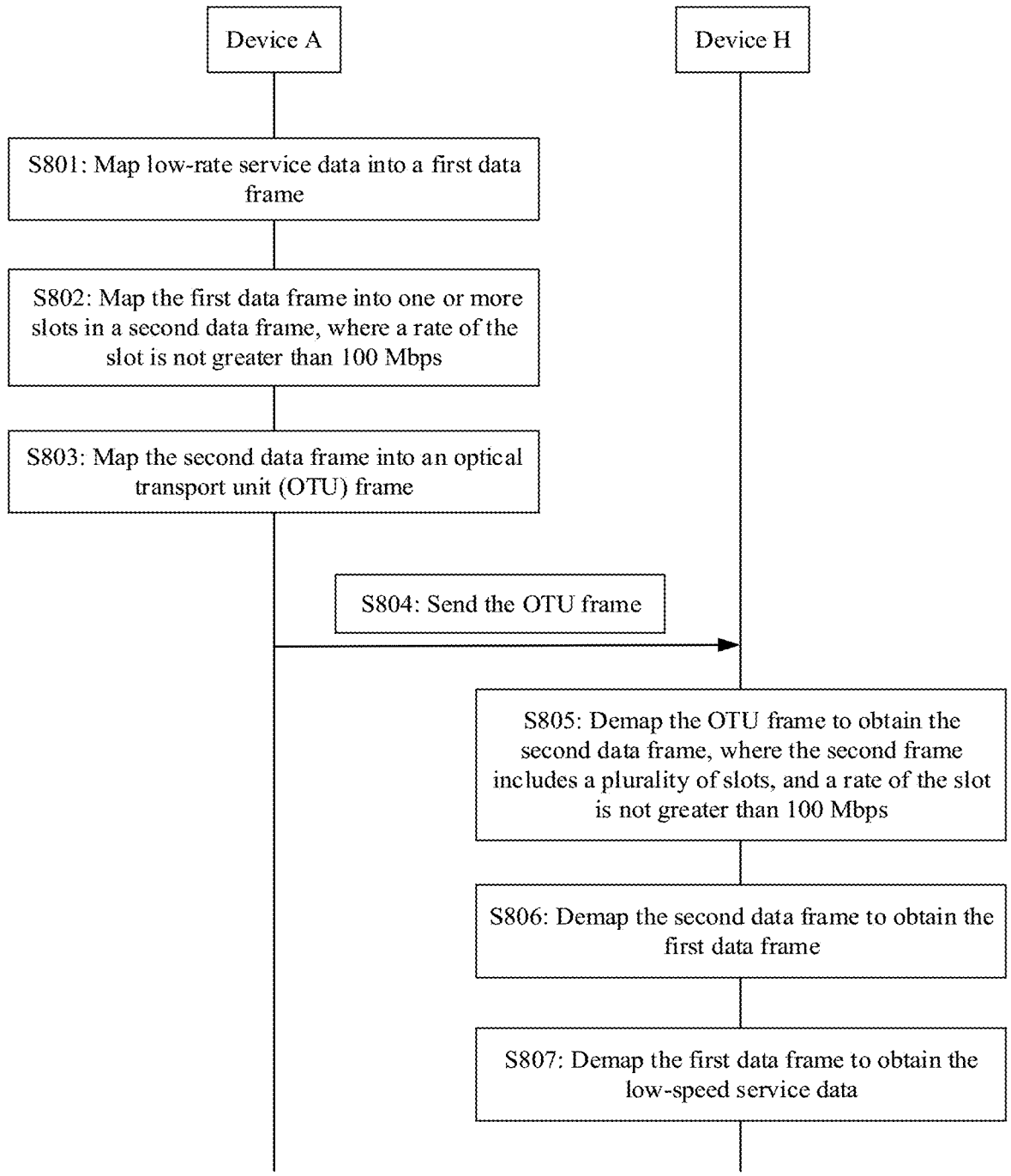
FIG. 10 is a flowchart of processing low-rate service data according to an embodiment of this application.

FIG. 10 is a schematic flowchart according to an embodiment. The following describes each step in detail. In the following steps, steps S801 to S804 are performed by the transmit end device A, and steps S805 to S807 are performed by the receive end device H. It should be noted that, to avoid repetition, that a step in which the receive end device H receives an OTU frame sent by the device A is not provided in the following steps.

S801: Map low-rate service data into a first data frame.

This step is similar to step S701 in FIG. 9. The description of step S701 is also applicable to this step. Details are not described herein again. For example, the device A maps the to-be-transmitted low-rate service data to the foregoing defined $ODU_{LR}$ frame. In this embodiment, that the low-rate service data is a VC3 and the $ODU_{LR}$ is an $ODU_{LR}$(VC3) is used as an example for subsequent description. A person skilled in the art may learn that the low-rate service may be any one of the existing low-rate services, for example, the SDH signal and the PDH signal mentioned above. For another example, low-rate service may be an STM-1 service, an STM-4 service, and an FE service. A frame structure of the $ODU_{LR}$ may also be any one of the foregoing plurality of example structures.

For example, the first data frame may include the overhead information shown in FIG. 4B. A FAS may be a fixed pattern, for example, 0xF6F62828. A value of an MFAS may range from 0 to 255, and this field is cyclically increased with an increase of a quantity of $ODU_{LR}$ frames. For example, a value of the MFAS in a frame 1 to a frame 256 are 0 to 255, and a value of a frame after a frame 257 is cyclically increased again from 0 to 255. A PM field may further include one or more of a trail trace identifier (TTI), 8-bit interleaved parity (BIP8), a backward defect indication (BDI), a backward error indication (BEI), or a status (STAT) overhead, and is used to monitor an end-to-end path of the $ODU_{LR}$. Functions of the possible overheads are described in Table 2. An APS/PCC provides an automatic protection switching/protection communication channel function, and is used to carry information related to a protection switching protocol.

TABLE 2

Description of the overhead functions included in the PM field

| Name | Definition |
| --- | --- |
| TTI | Used to identify a path, and including a source access point identifier, a target access point identifier, and information specified by an operator |
| BIP 8 | Used for data check |
| BEI | Used to indicate whether a bit error occurs on a path in a receiving direction |
| BDI | Used to indicate whether the path in the receiving direction is faulty |
| STAT | Used to indicate a path status |

Figure 11A:
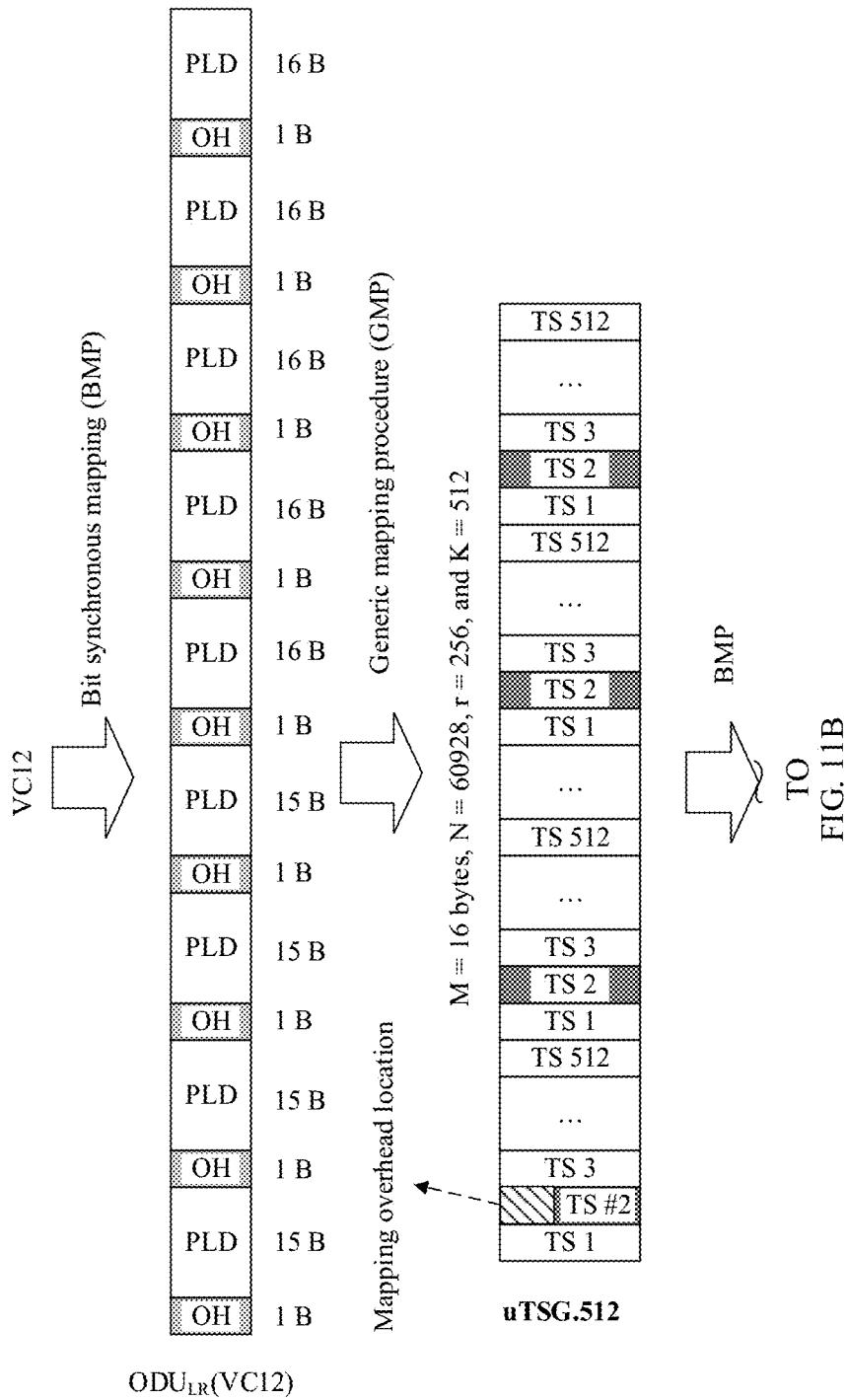
FIG. 11A and FIG. 11B are schematic diagrams of a possible mapping procedure of a low-rate service.
Figure 11B:
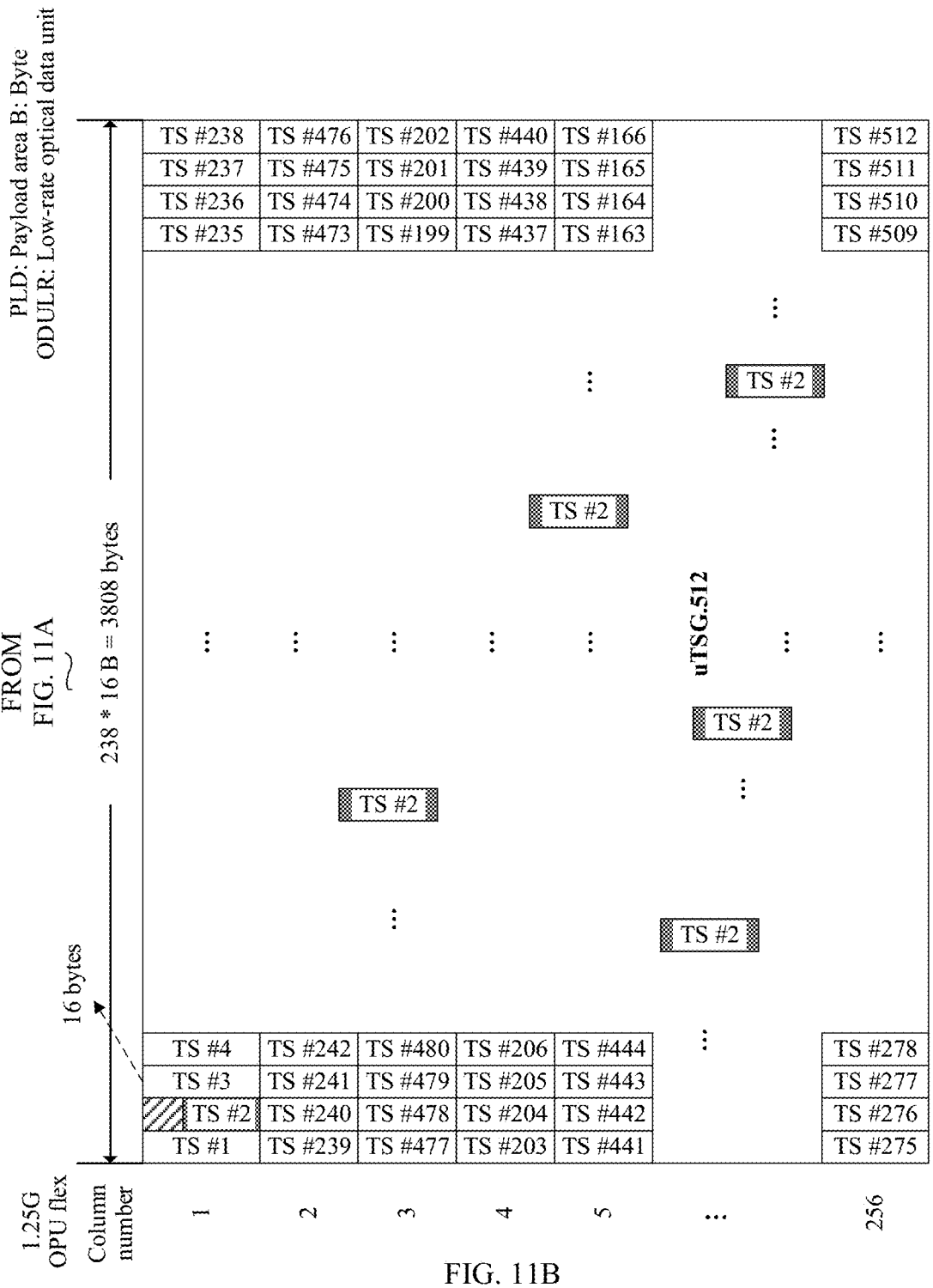

FIG. 11A and FIG. 11B show an example, where a first step shows that a VC12 service is mapped into an $ODU_{LR}$ frame. A bit rate of the VC12 service is 2.24 Mbit/s, and a size of the frame is 140 bytes. Bits of the VC12 service are synchronously mapped into a payload area in the $ODU_{LR}$ (VC12) frame. One VC12 frame is exactly placed in a payload area in one $ODU_{LR}$(VC12) frame. A size of the $ODU_{LR}$(VC12) frame is 149 bytes, a size of the payload area is 140 bytes, and a size of an overhead area is nine bytes. Then, overheads including a FAS, an MFAS, PM, and an APS/PCC are generated and placed in the overhead area in the $ODU_{LR}$(VC12). After calculation of 149/140*2.24 Mbit/s, the bit rate of the $ODU_{LR}$(VC12) is 2.384 Mbit/s.

S802: Map the first data frame into one or more slots in a second data frame, where a rate of the slot is not greater than 100 Mbps.

This step is similar to step S702 in FIG. 9. The description of step S702 is also applicable to this step. Details are not described herein again. Table 3 provides examples of more accurate rates of micro slots and corresponding quantities of micro slots when the second data frame is an ODU flex frame. The quantities of micro slots are 512 and 480. It should be noted that a rate of the ODU flex depends on a higher-order ODU frame that carries the ODU flex. Therefore, columns 2 to 4 in Table 3 provide rates and quantities of correspondingly micro slots obtained through division for different rates of frames that carry the ODU flex. It should be further noted that, for a micro slot division parameter (including a quantity of micro slots and accurate rates of the micro slots) of a second data frame of another type, reference may be made to Table 3. Details are not listed herein.

TABLE 3

Example of rates of micro slots and quantities of micro slots when the second data frame is an ODU flex

| | | Bit rate calculation formula | ODU 1 | ODU 2 | ODU 3 | ODU 4 |
| --- | --- | --- | --- | --- | --- | --- |
| ODUk.ts (Gbps) | | / | 1.244241681 | 1.24940962 | 1.25470373 | 1.301709 |
| 1.25 G ODU flex (Gbps) | | Rate of a single slot*15230/15232 | 1.244078309 | 1.249245569 | 1.25453898 | 1.301538 |
| Micro slot rate (Mbps) | n = 512 | Bit rate of a 1.25 G ODU flex*238/239/512 | 2.419673751 | 2.429723829 | 2.44001927 | 2.531431 |
| | n = 480 | Bit rate of a 1.25 G ODU flex*238/239/480 | 2.580985334 | 2.591705418 | 2.60268722 | 2.700193 |

Description of Table 3 is as follows.

(1) The second row shows bit rates of single 1.25 G slots included in corresponding ODU k (k=1, 2, 3, 4) frames.

(2) The third row shows bit rates corresponding to an ODU flex at a 1.25 G rate.

(3) The fourth row provides accurate corresponding rates of micro slots when one ODU flex frame is divided into 512 micro slots. The fifth row provides accurate corresponding rates of micro slots when one ODU flex frame is divided into 480 micro slots. It should be noted that the rate of the micro slot is only a rate at which a payload area in the ODU flex is occupied.

It can be learned from the foregoing table that, rates of micro slots of a same fixed quantity obtained through division are different depending on a rate of the second data frame. In other words, a bit rate of one ODU frame is equal to a bit rate of a single micro slot*a quantity of micro slots*a coefficient. The coefficient is equal to a quantity of bytes in one second data frame/(a quantity of bytes in one second data frame—a quantity of reserved bytes). The coefficient is used for reserving some margins when slot division is performed on the second data frame, such that a large frequency offset of a client signal can be tolerated, and even if there is a slight signal rate change, it can be ensured that the signal can be mapped into the second data frame. Generally, 0 to 4 bytes are reserved.

If a plurality of ODULRs need to be mapped into the second data frame, there are the following several possible implementations: Implementation 1: A plurality of first data frames ODULRs are mapped into one or more micro slots in an uTSG.K, and then the uTSG.K is mapped into a payload area in the second data frame. Implementation 2: A plurality of first data frames ODULRs are directly mapped into one or more micro slots in a payload area in the second data frame. Implementation 3: A plurality of first data frames $ODU_{LR}$ are separately mapped to intermediate frames, then the plurality of intermediate frames are multiplexed as an uTSG.K, and then the uTSG.K is synchronously mapped into a payload area in the second data frame. The intermediate frame is a subset of the uTSG.K, and includes n micro slots in the uTSG.K.

Using the third implementation as an example, a first data frame is described, and step S802 further includes the following: mapping the first data frame into an intermediate frame, where a quantity of slots included in the intermediate frame is equal to a quantity of slots in the second data frame that are to be occupied by the first data frame; and mapping the intermediate frame into the one or more slots in the second data frame.

Figure 12:
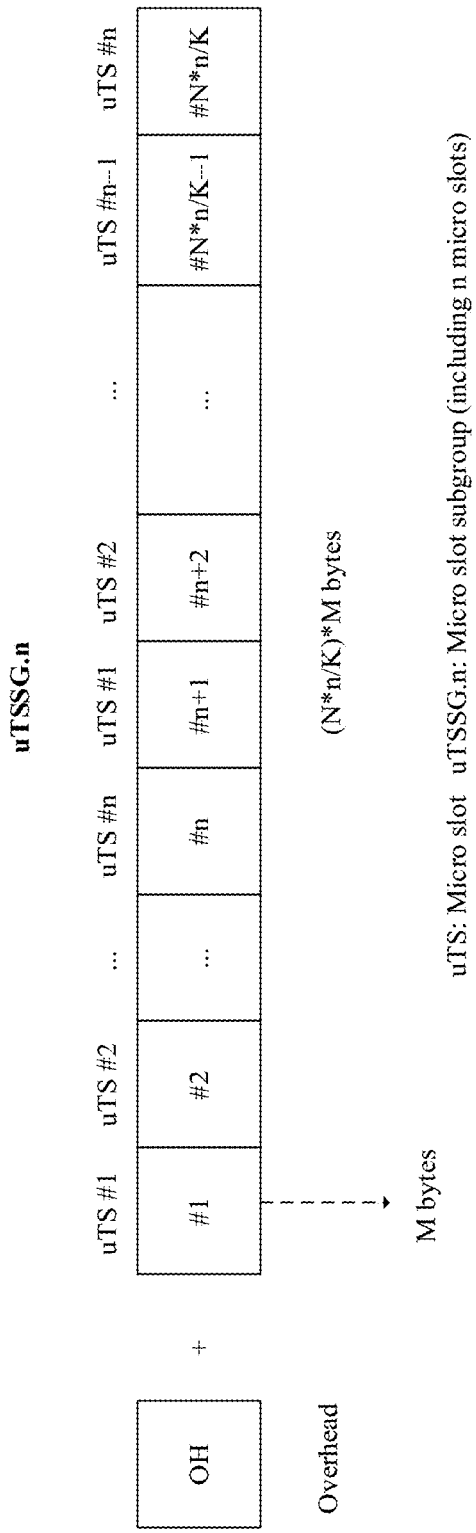
FIG. 12 is a schematic diagram of a possible structure of an intermediate frame.

The following further describes the intermediate frame with reference to FIG. 12. For simple description, the intermediate frame is subsequently referred to as a micro tributary slot sub group (uTSSG.n). n represents a quantity of micro slots included in the intermediate frame. For different types of first data frames, values of n may be different. It should be noted that, a name of the intermediate frame constitutes no limitation on this application, and this application also covers an intermediate frame having a same feature but another name. For example, the intermediate frame is referred to as a flexible slot group (FTSG.n), a programmable slot group (PTSG.n), or a flexible optical data tributary unit (ODTUflex.n). As shown in FIG. 12, the uTSSG.n includes two parts: an overhead area and a payload area, and is divided into n micro slots.

With reference to FIG. 11A and FIG. 11B, the following describes a process of mapping an $ODU_{LR}$ frame into the second data frame through a uTSSG.n frame, where a value of M is 16 bytes. For example, the $ODU_{LR}$ is an $ODU_{LR}$ (VC12), the second data frame is an ODU 1, and K=512. In other words, the second data frame is divided into 512 micro slots, that is, a uTSG.K is a uTSG.512, and a rate of each micro slot may be 2.419673751 Mbps shown in Table 3. The second data frame is divided into slots in a manner in FIG. 8B. Using the $ODU_{LR}$(VC12) frame shown in Table 1 as an example, a rate of the $ODU_{LR}$(VC12) frame is 2.384 Mbps. Therefore, one micro slot is required to carry the $ODU_{LR}$ frame. In other words, the uTSSG.n includes one micro slot, that is, a uTSSG.1. As shown in FIG. 11A, the $ODU_{LR}$ that has already carried the VC12 is mapped into the uTSSG.1 frame, where the uTSSG.1 frame includes 119*16 bytes, namely, 1904 bytes. Then, the uTSSG.1 frame is multiplexed into the uTSG.512, and the uTSG.512 is mapped into a r=256 row in the payload area in the second data frame using a bit synchronous mapping procedure (BMP). In other words, the uTSSG.1 is mapped into a micro slot in the second data frame. For example, the $ODU_{LR}$ frame may be mapped into the uTSSG.1 frame using a generic mapping procedure (generic mapping procedure). It should be noted that, in FIG. 12, the two steps of mapping the $ODU_{LR}$ (VC12) into the uTSSG.n and mapping the uTSSG.n into the uTSG.K are described in one step. In an actual application process, two steps or one step may be used for implementation.

It should be further noted that, according to the example in FIG. 11A and FIG. 11B, a person skilled in the art may obtain, without creative efforts, an example, in another condition (for example, the second data frame of a different type, or a different value of M, or a different rate of a micro slot), in which the $ODU_{LR}$ frame is mapped into the second data frame through the uTSSG.n. Details are not described in this application. It should be further noted that the intermediate frame uTSSG.n is not necessary. To simplify a mapping procedure or for other considerations, the $ODU_{LR}$ frame may be directly mapped into a corresponding slot in the second data frame.

To enable a receiving device to correctly obtain the $ODU_{LR}$ frame through parsing, the following four overheads need to be added to the second data frame.

Overhead 1: A payload type (PT) indication overhead is used to indicate that the current second data frame carries a plurality of low-rate $ODU_{LR}$ client signals through the uTSG.k. For example, a new value PT=0×25 is defined.

Overhead 2: A uTSG.K indication overhead is used to indicate a start location of the uTSG.K in the payload area in the second data frame.

Figure 13:
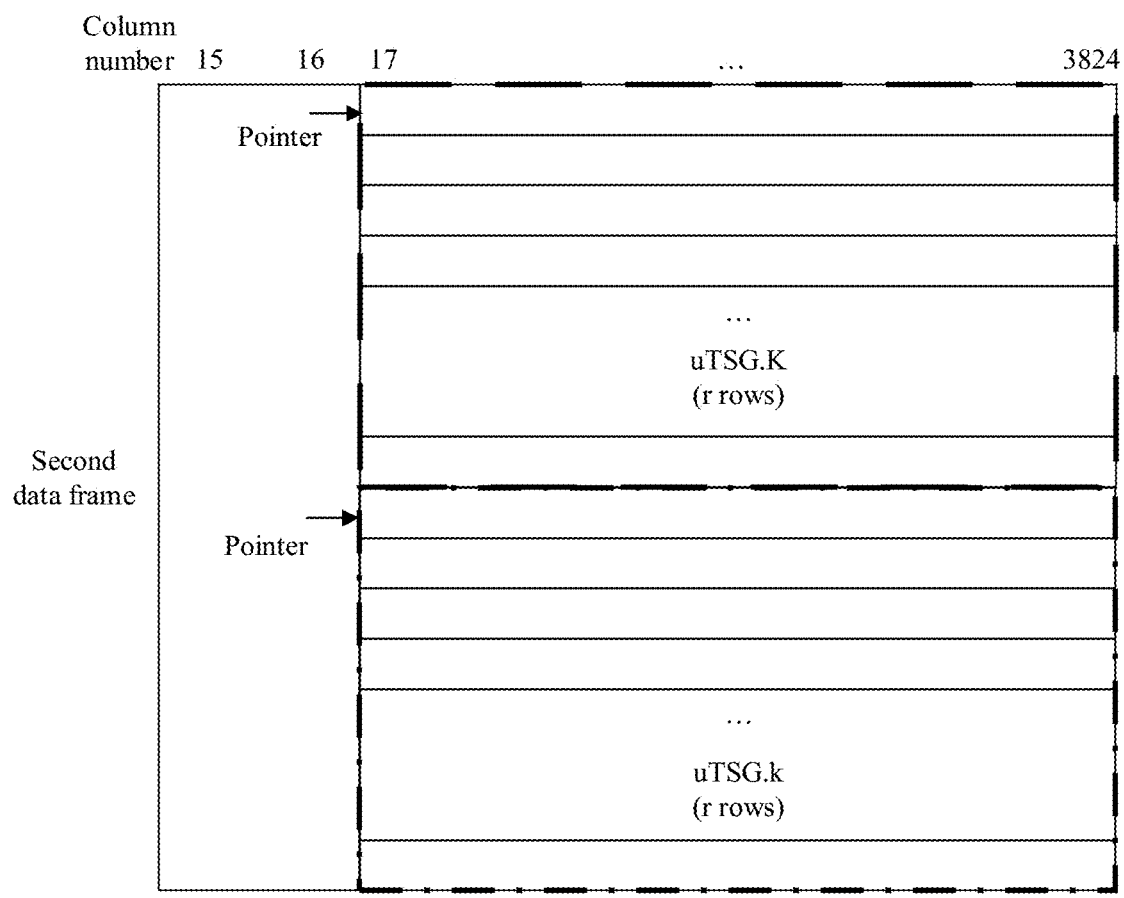
FIG. 13 is a schematic diagram of a location of a possible start location indication overhead.

If the uTSG.K is constructed based on a quantity of rows in the second data frame, for example, occupies r rows in the second data frame: ODU flex, the uTSG.K frame may start from any row in the payload area in the ODU flex. A uTSG.K start location indication overhead is defined to indicate a row from which the uTSG.k starts in the payload area in the ODU flex. For example, 8 bits in row 1 and column 16 of the ODU flex are used as a uTSG.K indication overhead pointer (as shown in FIGS. 13), and 8-bit patterns 01010101, 101010, 00110011, 11001100 respectively indicate that the start location of the uTSG.k is in row 1, row 2, row 3, or row 4. If the start location of the uTSG.K frame is not in the payload area in the ODU flex frame, the uTSG.K indication overhead pointer in the ODU flex is all 0s.

If the uTSG.K is constructed based on a quantity of frames in the second data frame, for example, occupies s frames in the second data frame: ODU flex, the uTSG.K frame may start from a payload area in any ODU flex frame. A uTSG.K indication overhead pointer is defined to indicate whether the uTSG.K frame starts from the payload area in the current ODU flex frame. For example, 8 bits in row 1 and column 16 of the ODU flex are used as the uTSG.K indication overhead pointer, and an 8-bit pattern 11111111 is used to indicate that the start location of the uTSG.k is in the payload area in the current ODU flex frame. If the start location of the uTSG.K frame is not in the payload area in the ODU flex frame, the uTSG.K indication overhead pointer in the ODU flex is all 0s.

It should be noted that an advantage of including the start location of the uTSG.K frame in the overhead is that a receive end can accurately determine the start location of the uTSG.K frame based on the information. The overhead information is not necessary. If the information is not carried in the overhead, the information may be configured on a device.

Overhead 3: A multiplex structure identifier (MSI) overhead is used to indicate distribution and an occupation status of micro slots in the second data frame, that is, indicate distribution and an occupation status of micro slots in the uTSG.K.

For example, using 512 micro slots as an example, the multiplex structure identifier MSI overhead needs to use 512*14 bits, and may be marked as MSI[0], MSI[1], . . . , and MSI[511], where MSI[0], MSI[1], . . . , and MSI[511] respectively correspond to a micro slot 1 to a micro slot 512. Each micro slot corresponds to one 14-bit. The 14 bits include two overhead fields: a type and a service indication (e.g., low-rate client identifier (LCID)). The type occupies four bits, and indicates whether a current micro slot is occupied. If the current micro slot is occupied, the type field indicates a type of a carried low-rate service. Table 4 provides an example. It should be noted that, in actual use, a value and a corresponding meaning may be different from those in the design in Table 4. This is not limited in this application. The LCID occupies 10 bits, and indicates a number of a low-rate service carried in a current micro slot. A value of the LCID may range from 0 to 1023.

TABLE 4

Example of type overheads of a low-rate service

| Type | Indicated service type |
|---|---|
| 0x0 | Not occupied |
| 0x1 | $ODU_{LR}$(VC12) |
| 0x2 | $ODU_{LR}$(VC3) |
| 0x3 | $ODU_{LR}$(VC4) |
| 0x4 | $ODU_{LR}$(E1) |
| 0x5 | $ODU_{LR}$(E3) |
| 0x6 | $ODU_{LR}$(E4) |
| 0x7 | $ODU_{LR}$(general) |
| 0x8 to 0xf | Reserved |

Figure 14:
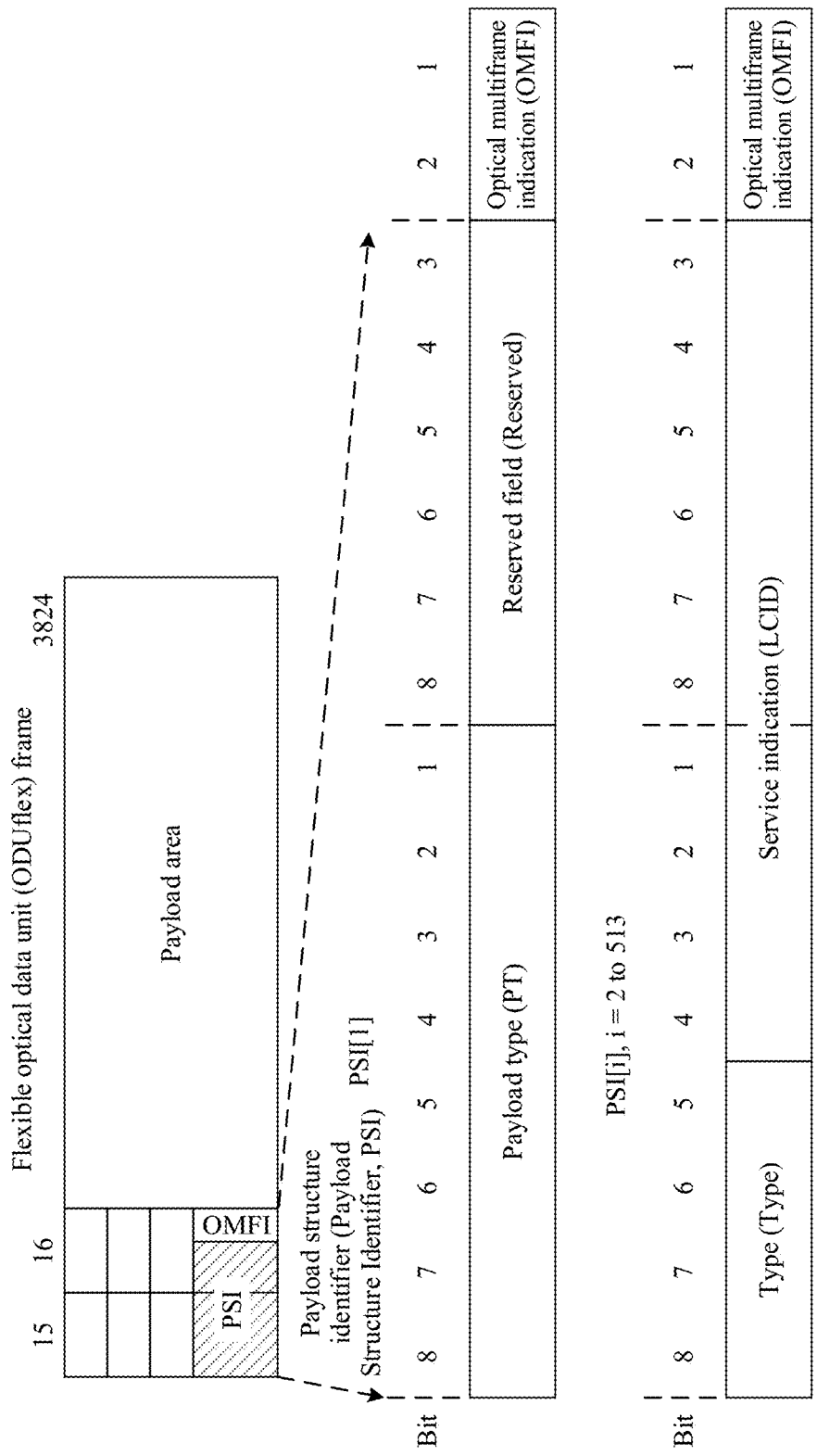
FIG. 14 is a schematic diagram of a location of a possible multiplex structure identifier overhead.

The multiplex structure identifier overhead may be placed in a location of a payload structure indication overhead in the second data frame. For example, as shown in FIG. 14, the overhead may be placed in row 4 and column 15 and column 16 of the ODU flex frame, and MSI[0], MSI[1], . . . , and MSI[511] are respectively placed in locations of PSI[2], PSI[1], . . . , and PSI[513] in a multiframe indication manner, where PSI refers to payload structure identifier. Alternatively, the overhead may be placed in a location of an overhead in the micro slot. For details, refer to related descriptions of "overhead 4".

It should be noted that, because a quantity of slots is excessively large, to indicate a micro slot occupation status through the PSI, a current definition of the multiframe indication needs to be extended. For example, a 2-bit optical multiframe indication (OMFI) may be defined, and occupies the least significant two bits in row 4 and column 16 of the second data frame. The OMFI and the currently existing multiframe indication MFAS in the second data frame are used in combination, 256 second data frames are used as one cycle, and the OMFI is increased progressively (a value ranges from 0 to 3). 1024 second data frames may be used as one large multiframe indication, to indicate an occupation status of, for example, 512 micro slots. In actual application, with reference to a specific quantity of slots, an OMFI of another length may be designed to transfer corresponding slot occupation indication information.

Overhead 4: Micro tributary slot overhead (uTSOH).

Each micro slot corresponds to one micro slot overhead, and the micro slot overhead is used to indicate an occupation status of the current micro slot and used to place mapping information. The mapping information is mapping overheads correspondingly generated when a generic mapping procedure (GMP) is used to map an $ODU_{LR}$ signal into the uTSG.K or n micro slots in the second data frame.

The micro slot overhead is located in the first several bytes in each micro slot payload area. For example, for the uTSG.k with a slot interleaving granularity of M=16 bytes, the first 16 bytes in each micro slot payload area may be selected as the micro slot overhead area (as shown in FIG. 11A). If the multiplex structure identifier overhead is placed in a location of the micro slot overhead, MSI[0], MSI[1], . . . , and MSI[511] are respectively placed in the first 14 bits (namely, the most significant six bits of the first byte and the second byte) in micro slot overheads corresponding to a micro slot 1 to a micro slot 512.

The mapping overhead includes Cm, CnD, and check information generated through mapping in the GMP. Cm represents an amount, in a form of m bits, of client data of the ODULR signal that is mapped into the uTSG.K or the n micro slots in the second data frame. If m=8, Cm represents a quantity of bytes of the $ODU_{LR}$ signal mapped into the uTSG.K or the n micro slots in the second data frame. If m=6, Cm represents a quantity of double bytes of the $ODU_{LR}$ signal mapped into the uTSG.K or the n micro slots in the second data frame. A value of m is not limited in this application. CnD is used to represent clock information of the $ODU_{LR}$ signal. If precision is a bit, a value of CnD ranges from 1 to m-1. If precision is a byte, a value of CnD ranges from 1 to m/8-1. The check information is cyclic redundancy check (CRC) information, and is used to check the Cm information and the CnD information, to ensure robustness of the information. The mapping overhead occupies six bytes. The six bytes may be placed in the uTSG.K occupied by the $ODU_{LR}$ or in a micro slot overhead location, for example, a third byte to an eighth byte of a mapping overhead location shown in FIG. 11A, corresponding to the first micro slot in the n micro slots in the second data frame. If the multiplex structure identifier overhead is not placed in the micro slot overhead, the mapping overhead may be placed in a first byte to a sixth byte. It should be noted that a specific quantity of bits occupied by Cm, CnD, and the CRC is not limited in this application, and may be flexibly determined based on a mapping granularity and a payload size that are used for mapping. Similarly, the mapping overhead location may alternatively be another overhead location. This is not limited in this application.

It should be noted that, in a GMP mapping mode, when a rate of a carried low-rate service is less than a total rate of the n micro slots, a location of the first code block in a payload area formed by the n micro slots is always used as a padding block in which no valid data is placed. Therefore, using the code block to place the mapping overhead information can reduce overheads, and improve overhead utilization.

Values of Cn and CnD are described below with reference to examples. For example, the second data frame is an ODU flex, a bit rate of the second data frame is equal to a bit rate of an ODU 0, K=512, M=16 bytes, N=60928, and r=256. Correspondingly, a payload area in each micro slot includes N/K=60928/512=119*16 bytes=1904 bytes. When an $ODU_{LR}$ signal (it is assumed that a frequency offset of the $ODU_{LR}$ signal is ±100 ppm) occupies m micro slots in the second data frame, if the mapping granularity is 1 byte, the payload size is m*1904 bytes, and corresponding minimum and maximum values of the Cm are an $ODU_{LR}$ bit rate*(1-100ppm)/((1+20 ppm)*m*a bit rate of a single micro slot)*m*1904 and an $ODU_{LR}$ bit rate*(1+100 ppm)/((1-20 ppm)*m*a bit rate of a single micro slot)*m*1904, respectively. A value of CnD ranges from 1 bit to 7 bits. If the mapping granularity is 16 bytes, the payload size is m*119*16 bytes, and corresponding minimum and maximum values of the Cm are an $ODU_{LR}$ bit rate*(1-100 ppm)/((1+20 ppm)*m*(a bit rate of a single micro slot)*m*119 and an $ODU_{LR}$ bit rate*(1+100 ppm)/((1-20 ppm)*m*(a bit rate of a single micro slot)*m*119, respectively. A value of CnD ranges from 1 byte to 15 bytes. The formula for calculating a value range of Cm is applicable to different types of $ODU_{LR}$ frames. The following table provides examples of value ranges of Cm and CnD of some types of $ODU_{LR}$ frames.

and is placed in a location of a micro slot overhead in the first micro slot occupied by the $ODU_{LR}$(VC12). Then, the uTSSG.1 is multiplexed into the uTSG.512, and the uTSG.512 is mapped into 256 rows in the payload area in the 1.25 ODU flex frame in a bit synchronous mapping mode. At the same time or subsequently, a required overhead is generated, includes a payload type indicator overhead PT=0×25, a uTSG.K indicator overhead, and a multiplex structure identifier overhead, and is placed in a corresponding location.

It should be noted that the second data frame in this application may be an ODU flex, an ODU 0, an ODU 1, an ODU 2, an ODU 3, an ODU 4, an ODU Cn, or the like with any rate. The 1.25 Gbit/s ODU flex is equivalent to the ODU 0. An m*1.25 G ODU flex has a 4-row 3824-column OTN frame structure. In addition, a new frame structure is further defined. In other words, the m*1.25 G ODU flex is considered as a concatenation of m*1.25G ODU flex, and is constituted by m*1.25G ODU flex instance frames. In this way, assuming that each 1.25G ODU flex is divided into 512*2.5 Mbit/s micro slots, the m*1.25 G ODU flex is divided into m*512 2.5 Mbit/s micro slots in total. Division is also performed in the foregoing manner provided in this application.

S803: Map the second data frame into an optical transport unit (OTU) frame.

This step is similar to step S703 in FIG. 9. The description of step S703 is also applicable to this step. Details are not described herein again. For example, the second data frame is directly mapped into the OTU frame. In this case, over-

TABLE 5

Examples of values of Cm and CnD

| $ODU_{LR}$ type | Quantity of occupied micro slots | Mapping granularity (unit: byte) | Payload Size (unit: single mapping granularity) | Minimum value of Cm (unit: Mbit) | Maximum value of Cm (unit: Mbit) | Value of CnD (unit: bit or byte) |
|---|---|---|---|---|---|---|
| $ODU_{LR}$(VC12) | 1 | 1 | 1904 | 1875 | 1876 | 1 bit to 7 bits |
|  | 1 | 16 | 119 | 117 | 118 | 1 byte to 15 bytes |
| $ODU_{LR}$(VC3) | 21 | 1 | 21*1904 | 38977 | 38981 | 1 bit to 7 bits |
|  | 21 | 16 | 21*119 | 2436 | 2437 | 1 byte to 15 bytes |
| $ODU_{LR}$(VC4) | 63 | 1 | 63*1904 | 118745 | 118755 | 1 bit to 7 bits |
|  | 63 | 16 | 63*119 | 7421 | 7423 | 1 byte to 15 bytes |

An example of this step is described with reference to FIG. 11A and FIG. 11B. For the $ODU_{LR}$(VC12) that carries a VC12 service, a bit rate is 2.384 Mbit/s. It is assumed that the $ODU_{LR}$(VC12) is transmitted through a 1.25 G ODU flex, a bit rate of the 1.25 G ODU flex is 1.244078309 Gbit/s (which is obtained based on a 1.25 G slot of a higher-order ODU 1, referring to Table 3). The 1.25 G ODU flex is divided into 512 micro slots, namely, a uTSG.512. The uTSG.512 uses a slot interleaving granularity of M=16 bytes, includes N=60928*16 byte code blocks, and occupies 256 rows in a payload area in the 1.25G ODU flex frame. Each micro slot includes 119*16 byte code blocks, a bit rate of each micro slot is 2.419673751 Mbit/s. When the $ODU_{LR}$(VC12) is transmitted through the 1.25 G ODU flex, only one micro slot needs to be occupied. It is assumed that a micro slot TS #2 is occupied. The $ODU_{LR}$(VC12) is mapped into the micro slot TS #2 in the 1.25G ODU flex. In other words, the $ODU_{LR}$(VC12) is mapped into a uTSSG.1 (including TS #2) through a GMP. In addition, a corresponding mapping overhead including a Cm value, a CnD value (for values, refer to Table 5), and check information is generated, heads need to be added, to implement operation, running, and management functions at an ODU level.

S804: Send the OTU frame.

For example, the device A sends the OTU frame to a downstream device, for example, the device H in this embodiment, through one or more optical fibers. It should be noted that, if a service transmission path includes a plurality of network devices, the downstream device to which the source device sends the OTU frame is an intermediate device rather than a destination device.

S805: Demap the OTU frame to obtain the second data frame. The second data frame includes a plurality of slots, and a rate of the slot is not greater than 100 Mbps.

After receiving the OTU frame transmitted through the optical fiber, the device H parses out the second data frame from the frame. A feature of the second data frame is as described in step S802, and details are not described herein again.

S806: Demap the second data frame to obtain the first data frame.

S807: Demap the first data frame to obtain the low-rate service data.

For example, the device H further demaps the second data frame to obtain the first data frame, namely, the ODULR. Then, the device H obtains the low-rate service data from the ODULR frame.

By defining a new ODU frame structure and a mapping procedure, the method provided in this embodiment of this application can resolve a problem in other approaches that processing of low-rate service data is complex. This improves processing efficiency. In addition, the method provided in this embodiment of this application also has an advantage of a high processing rate without multi-level mapping.

Figure 15:
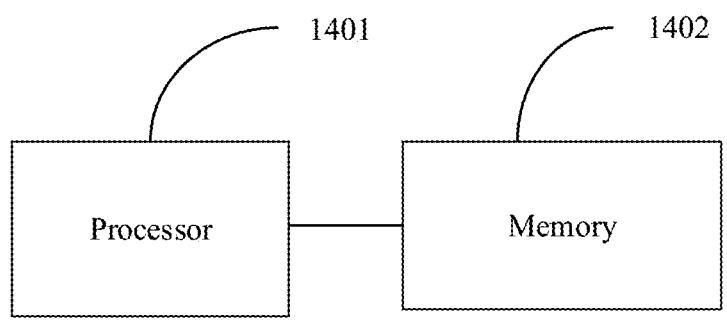
FIG. 15 is a schematic structural diagram of a possible network device.

An embodiment of this application further provides another structure of an OTN device. As shown in FIG. 15, an OTN device 1400 may include a processor 1401 and a memory 1402. The OTN device may serve as both a sending node and a receiving node.

When the OTN device serves as a sending node, the processor 1401 is configured to implement the method performed by the sending node in FIG. 9 or FIG. 10. In an implementation process, steps of a processing procedure may be implemented, using an integrated logic circuit of hardware in the processor 1401 or an instruction in a form of software, to complete the method performed by the sending node in FIG. 9 or FIG. 10. When the OTN device serves as a receiving node, the processor 1401 is configured to implement the method performed by the receiving node in FIG. 10. In an implementation process, steps of a processing procedure may be implemented, using the integrated logic circuit of the hardware in the processor 1401 or an instruction in a form of software, to complete the method performed by the receiving node in FIG. 10. It should be noted that the processor 1401 and the memory 1402 may be located in the tributary board in the structural diagram, shown in FIG. 3, of the hardware of the network device.

In this embodiment of this application, the processor 1401 may be a general-purpose processor, a digital signal processor, an application-specific integrated circuit, a field programmable gate array or another programmable logic device, a discrete gate or transistor logic device, or a discrete hardware component, and can implement or perform the methods, steps, and logical block diagrams disclosed in the embodiments of this application. The general-purpose processor may be a microprocessor or any conventional processor or the like. The steps of the method disclosed with reference to the embodiments of this application may be directly performed by a hardware processor, or may be performed hardware in the processor in combination with a software unit. Program code executed by the processor 1401 to implement the foregoing method may be stored in the memory 1402. The memory 1402 is coupled to the processor 1401. The coupling in this embodiment of this application is an indirect coupling or a communication connection between apparatuses, units, or modules, may be in an electrical form, a mechanical form, or another form, and is used for information exchange between the apparatuses, the units, and the modules. The processor 1401 may cooperate with the memory 1402. The memory 1402 may be a non-volatile memory, such as a hard disk drive (HDD), or may be a volatile memory, such as a random-access memory (RAM). The memory 1402 is any other medium that can be configured to carry or store expected program code in a form of an instruction or a data structure and that can be accessed by a computer. However, the memory 1402 is not limited thereto.

Based on the foregoing embodiments, an embodiment of this application further provides a computer storage medium. The storage medium stores a software program, and when the software program is read and executed by one or more processors, the method provided in any one or more of the foregoing embodiments may be implemented. The computer storage medium may include: any medium that can store program code, such as a Universal Serial Bus (USB) flash drive, a removable hard disk, a read-only memory, a random-access memory, a magnetic disk, or an optical disc.

Based on the foregoing embodiments, an embodiment of this application further provides a chip. The chip includes a processor configured to implement a function in any one or more of the foregoing embodiments, for example, obtain or process a data frame in the foregoing method. Optionally, the chip further includes a memory. The memory is configured to store a program instruction and data that are necessary for and executed by the processor. The chip may include a chip, or may include a chip and another discrete device.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a compact disc read-only memory (CD-ROM), an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of another programmable data processing device to generate a machine, such that the instructions executed by the computer or the processor of the other programmable data processing device generate an apparatus for implementing a function in one or more procedures in the flowcharts and/or in one or more blocks in the block diagrams.

These computer program instructions may alternatively be stored in a computer-readable memory that can instruct a computer or another programmable data processing device to work in a manner, such that the instructions stored in the computer-readable memory generate an artifact that includes an instruction apparatus. The instruction apparatus implements a function in one or more procedures in the flowcharts and/or in one or more blocks in the block diagrams.

These computer program instructions may also be loaded onto a computer or another programmable data processing device, such that a series of operations and steps are performed on the computer or the other programmable device, to generate computer-implemented processing. Therefore, the instructions executed on the computer or the other programmable device provide steps for implementing a function in one or more procedures in the flowcharts and/or in one or more blocks in the block diagrams.

A person skilled in the art can make various modifications and variations to the embodiments of this application without departing from the scope of the embodiments of this application. This application is intended to cover these modifications and variations to the embodiments of this application provided that they fall within the scope of protection defined by the following claims and their equivalent technologies.

What is claimed is:

1. A method for processing service data in an optical transport network (OTN), the method comprising:
   mapping low-rate service data to a first data frame, wherein the first data frame comprises an overhead area and a payload area, wherein the payload area is configured to carry the low-rate service data, wherein the overhead area is configured to carry information for management and maintenance of the low-rate service data, wherein a rate of the payload area is not less than a first rate of the low-rate service data, and wherein the first rate is less than 1 gigabits per seconds (Gbps);
   mapping the first data frame to an intermediate frame;
   mapping the intermediate frame to one or more slots in a second data frame, wherein a rate of each slot in the one or more slots is not greater than 100 megabits per seconds (Mbps);
   mapping the second data frame to an OTN frame; and
   sending the OTN frame through the OTN.

2. The method according to claim 1, wherein the overhead area comprises a frame header indication and path monitoring information.

3. The method according to claim 1, wherein a quantity of bytes in the payload area is not greater than 1.25 times a quantity of bytes in a frame structure of the low-rate service data.

4. The method according to claim 3, wherein the first data frame is an optical synchronous digital hierarchy (SDH) data frame.

5. The method according to claim 1, wherein the low-rate service data is any one of an E1 service type, an E3 service type, an E4 service type, a virtual container (VC)12 service type, a VC3 service type, a VC4 service type, a synchronous transport module (STM)-1 service type, an STM-4 service type, or a Fast Ethernet (FE) service type.

6. The method according to claim 1, further comprising performing division into K slots using a plurality of second data frames or an integer quantity of rows in the second data frame, wherein the second data frame has a multi-row and multi-column structure when using the integer quantity of rows to perform division into the K slots, and wherein K is a positive integer.

7. The method according to claim 1, further comprising placing mapping information in the one or more slots in the second data frame, wherein the mapping information comprises a quantity in a form of m bits and clock information that are of the first data frame and that are mapped to the one or more slots in the second data frame.

8. The method according to claim 1, wherein the second data frame includes a payload type (PT) indication overhead indicating that a plurality of low-rate service data is carried in the second data frame.

9. The method according to claim 8, wherein the second data frame includes an indication overhead indicating a start location of the low-rate service data in the payload area of the second data frame.

10. The method according to claim 9, wherein the second data frame includes a multiplex structure identifier (MSI) overhead indicating a distribution status of slots in the second data frame.

11. The method according to claim 10, wherein the MSI overhead is located in a payload area of the second data frame.

12. A method for processing service data in an optical transport network (OTN), the method comprising:
   receiving a first data frame from the OTN, wherein the first data frame comprises a plurality of slots, and wherein a rate of the plurality of slots is not greater than 100 megabits per seconds (Mbps);
   demapping the first data frame to obtain an intermediate frame;
   demapping the intermediate frame to obtain a second data frame, wherein the second data frame comprises an overhead area and a payload area, wherein the payload area is configured to carry low-rate service data, wherein the overhead area is configured to carry information for management and maintenance of the low-rate service data, wherein a rate of the payload area in the second data frame is not less than a first rate of the low-rate service data, wherein the first rate is less than 1 gigabit per second (Gbps), and wherein one or more slots in the first data frame are configured to carry the second data frame; and
   demapping the second data frame to obtain the low-rate service data.

13. The method according to claim 12, wherein the overhead area comprises a frame header indication and path monitoring information.

14. The method according to claim 12, wherein a quantity of bytes in the payload area is not greater than 1.25 times a quantity of bytes in a frame structure of the low-rate service data.

15. The method according to claim 14, wherein the low-rate service data is any one of an E1 service type, an E3 service type, an E4 service type, a virtual container (VC)12 service type, a VC3 service type, a VC4 service type, a synchronous transport module (STM)-1 service type, an STM-4 service type, or a Fast Ethernet (FE) service type.

16. An apparatus for processing service data in an optical transport network (OTN), the apparatus comprising:
   a processor; and
   a memory coupled to the processor and configured to store instructions that, when executed by the processor, cause the apparatus to:
      map low-rate service data to a first data frame, wherein the first data frame comprises an overhead area and a payload area, wherein the payload area is configured to carry the low-rate service data, wherein the overhead area is configured to carry information for management and maintenance of the low-rate service data, wherein a rate of the payload area in the first data frame is not less than a first rate of the low-rate service data, and wherein the first rate is less than 1 gigabit per second (Gbps);
      map the first data frame to an intermediate frame;
      map the intermediate frame to one or more slots in a second data frame, wherein a rate of each slot in the one or more slots is not greater than 100 megabits per second (Mbps);
      map the second data frame into an OTN frame; and
      send the OTN frame through the OTN.

17. The apparatus according to claim 16, wherein the overhead area comprises a frame header indication and path monitoring information.

18. The apparatus according to claim 17, wherein the second data frame includes an indication overhead indicating a start location of the low-rate service data in the payload area of the second data frame.

19. The apparatus according to claim 16, wherein the low-rate service data is any one of an E1 service type, an E3 service type, an E4 service type, a virtual container (VC)12 service type, a VC3 service type, a VC4 service type, a synchronous transport module (STM)-1 service type, an STM-4 service type, or a Fast Ethernet (FE) service type.

20. The apparatus according to claim 16, wherein the first data frame is an optical synchronous digital hierarchy (SDH) data frame.

21. The apparatus according to claim 16, wherein a quantity of bytes in the payload area is not greater than 1.25 times a quantity of bytes in a frame structure of the low-rate service data.

22. The apparatus according to claim 21, wherein the first data frame is an optical synchronous digital hierarchy (SDH) data frame.

23. The apparatus according to claim 16, wherein the second data frame includes a payload type (PT) indication overhead indicating that a plurality of low-rate service data is carried in the second data frame.

\* \* \* \* \*